(12) United States Patent
Mizutani

(10) Patent No.: US 11,516,371 B2
(45) Date of Patent: Nov. 29, 2022

(54) CLEANING APPARATUS FOR A DETECTION SURFACE OF A DETECTION ELEMENT

(71) Applicant: CANON KABUSHIKI KAISHA, Tokyo (JP)

(72) Inventor: Shoma Mizutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 391 days.

(21) Appl. No.: 16/573,121

(22) Filed: Sep. 17, 2019

(65) Prior Publication Data

US 2020/0092445 A1 Mar. 19, 2020

(30) Foreign Application Priority Data

Sep. 19, 2018 (JP) .............................. JP2018-175337
Sep. 19, 2018 (JP) .............................. JP2018-175338
Aug. 23, 2019 (JP) .............................. JP2019-153192

(51) Int. Cl.
*H04N 5/217* (2011.01)
*H04N 5/225* (2006.01)
*H04N 5/232* (2006.01)
*G08B 21/18* (2006.01)
*B08B 1/00* (2006.01)

(52) U.S. Cl.
CPC ............ *H04N 5/2171* (2013.01); *B08B 1/006* (2013.01); *G08B 21/182* (2013.01); *H04N 5/22521* (2018.08); *H04N 5/23203* (2013.01)

(58) Field of Classification Search
CPC ................ G02B 17/56; G02B 27/0006; H04N 1/00909; H04N 5/2257; H04N 5/2171; G03B 17/56; G05B 19/00; G05B 11/00; B08B 13/00; B08B 5/02; B08B 1/02; B08B 1/008; B08B 1/006
USPC .................................................. 348/373–376
See application file for complete search history.

(56) References Cited

U.S. PATENT DOCUMENTS

2005/0129394 A1* 6/2005 Ichikawa ............... G03B 17/48
396/429

FOREIGN PATENT DOCUMENTS

JP 2006-100875 A 4/2006
JP 2007-052074 A 3/2007

* cited by examiner

*Primary Examiner* — Xi Wang
(74) *Attorney, Agent, or Firm* — Cowan, Liebowitz & Latman, P.C.

(57) ABSTRACT

A cleaning apparatus that cleans a detection surface of a detection element, comprises an attachment to which a detection apparatus including the detection element can be attached, a communication unit configured to communicate with the detection apparatus, a cleaning unit configured to clean the detection surface of the detection element, and a control unit configured to control a driving unit of the detection element included in the detection apparatus through the communication unit. When cleaning by the cleaning unit, the control unit controls the position of the detection element by driving the driving unit through the communication unit.

7 Claims, 12 Drawing Sheets

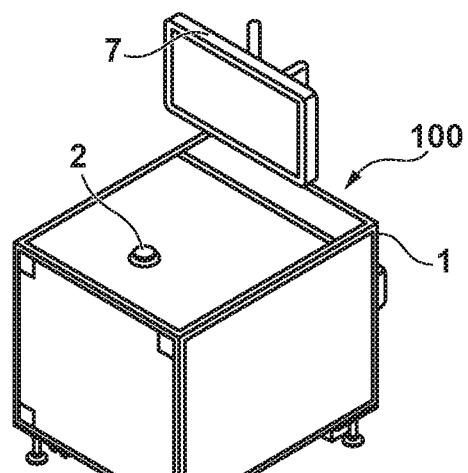
FIG. 1A
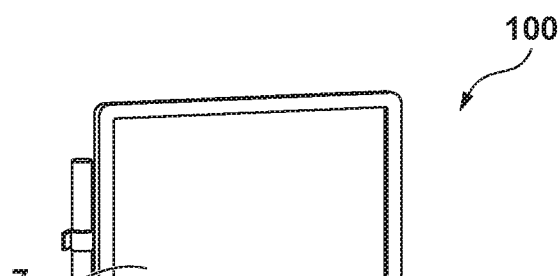
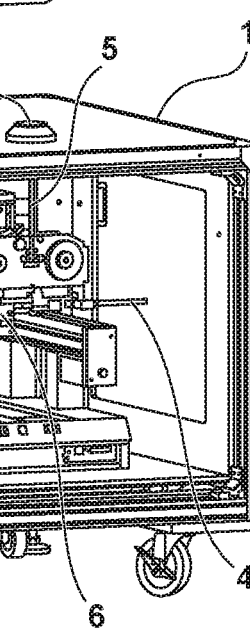
FIG. 1B
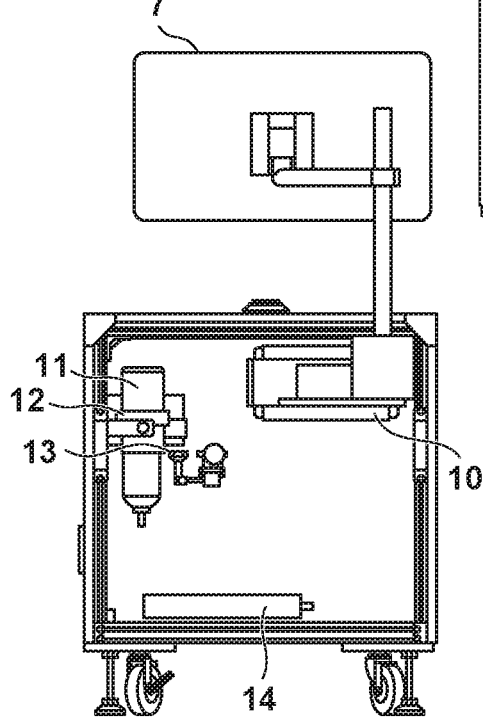
FIG. 1C

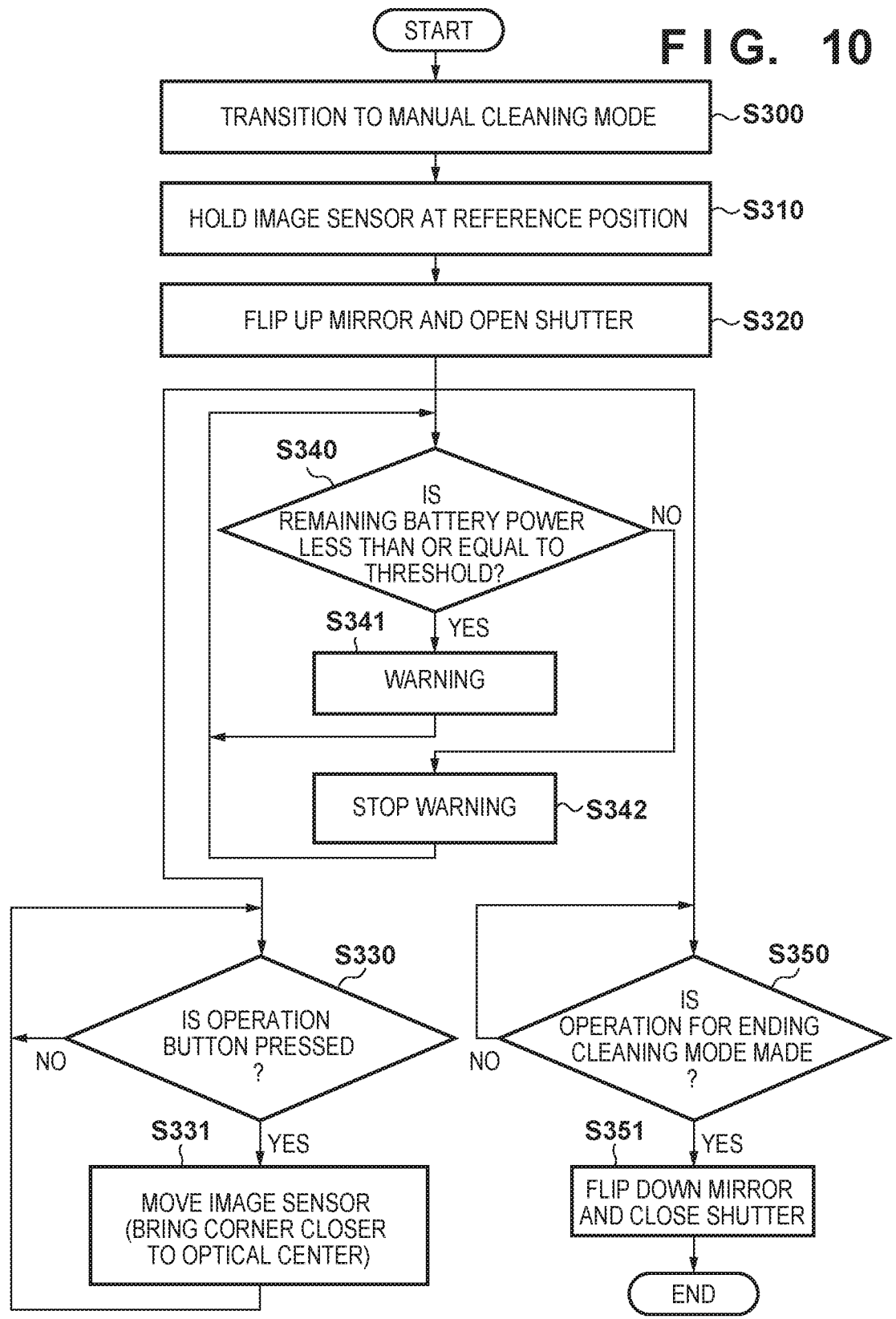

FIG. 11A
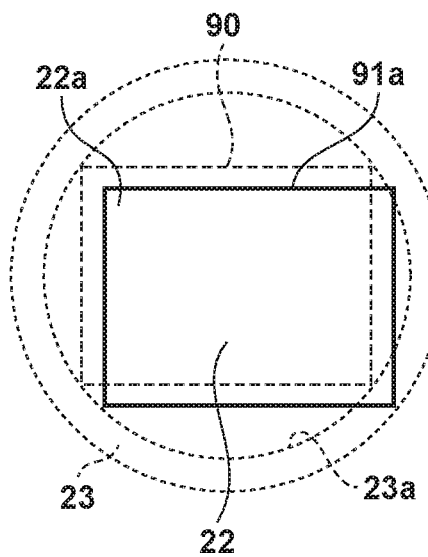
FIG. 11B
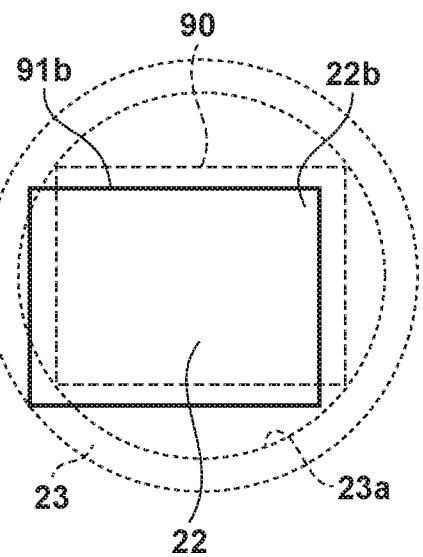
FIG. 11D
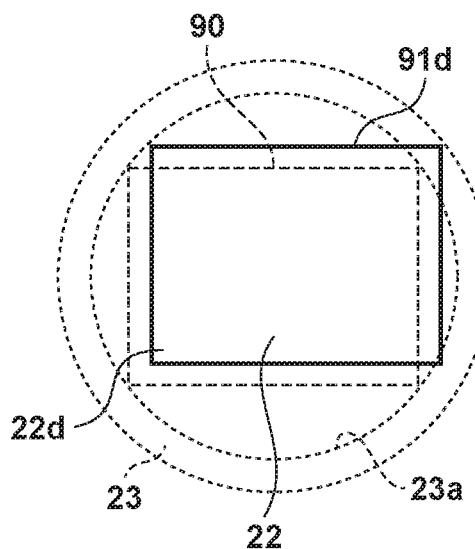
FIG. 11C
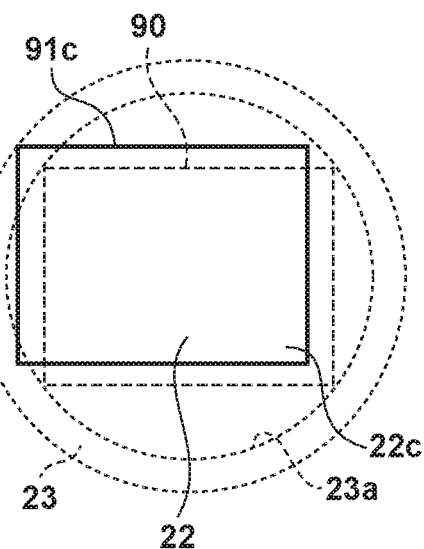

CLEANING APPARATUS FOR A DETECTION SURFACE OF A DETECTION ELEMENT

BACKGROUND OF THE INVENTION

Field of the Invention

The present invention relates to techniques for cleaning detection elements such as image sensors.

Description of the Related Art

With a detection element that detects light, electromagnetic waves, or the like, dust adhering to the detection surface and producing erroneous detections is a problem. For example, in a digital camera including an image sensor in which light-receiving elements are arranged, periodically cleaning the image capturing surface of the image sensor suppresses a drop in the quality of images obtained thereby. Japanese Patent Laid-Open No. 2007-052074 proposes a cleaning tool that removes dust adhering to the surface of an image sensor by pressing a rectangular elastic member against the image sensor. Additionally, Japanese Patent Laid-Open No. 2006-100875 proposes a cleaning method that removes dust by bringing a cleaning member toward an image sensor and rocking the cleaning member using an image sensor driving unit provided in an image capture apparatus.

According to the cleaning tool of Japanese Patent Laid-Open No. 2007-052074, the image sensor is supported in a floating state while the image sensor driving unit is not operational. This means that the position may shift in response to even a small force, making the cleaning operation difficult to carry out. Even if the image sensor is being held, a user must work with less pressure than the holding force of the image sensor driving unit, which makes the cleaning process difficult.

Many precision components are present around the image sensor, and users must carry out the cleaning work with great care so as to prevent damage from contact. For example, in a single-lens reflex camera, a mirror for guiding the path of light to the viewfinder is located between the lens attachment and the image sensor. Although the mirror is retracted from the optical path when cleaning, care must be taken so that the mirror and the cleaning tool do not contact each other when cleaning near the corners of the image sensor. A shutter which shields light from being incident on the image sensor is also present in front of the image sensor. The shutter is opened to expose the image capturing surface when cleaning, but if the cleaning tool makes contact with the shutter opening, which is a precision component, the shutter opening may become deformed.

Driving an image sensor driving unit while a cleaning member is pressed against the image sensor as per Japanese Patent Laid-Open No. 2006-100875 has the following problems. For example, if the cleaning member has a large surface area, the resulting increased friction may cause the rocking action to be insufficient. If the cleaning member is small, however, the process of approaching, moving, and retracting must be repeated many times to clean the entire surface of the image sensor, which may prolong the cleaning operation.

SUMMARY OF THE INVENTION

The present invention has been made in consideration of the aforementioned problems, and realizes a technique for simplifying a cleaning task and providing high cleaning performance.

The present invention also realizes a technique that enables an image sensor to be cleaned safely and easily.

In order to solve the aforementioned problems, the present invention provides a cleaning apparatus that cleans a detection surface of a detection element, the apparatus comprising: an attachment to which a detection apparatus including the detection element can be attached; a communication unit configured to communicate with the detection apparatus; a cleaning unit configured to clean the detection surface of the detection element; and a control unit configured to control a driving unit of the detection element included in the detection apparatus through the communication unit, wherein when cleaning by the cleaning unit, the control unit controls the position of the detection element by driving the driving unit through the communication unit.

In order to solve the aforementioned problems, the present invention provides a detection apparatus including a detection element, the apparatus comprising: a driving unit capable of moving the position of the detection element; an attachment that can be attached to a cleaning apparatus; a communication unit configured to communicate with the cleaning apparatus; and a control unit configured to control the driving unit, wherein the control unit controls the driving unit by communicating with the cleaning apparatus through the communication unit in a state where the detection apparatus is attached to the cleaning apparatus by the attachment.

In order to solve the aforementioned problems, the present invention provides a system comprising a cleaning apparatus that cleans a detection surface of a detection element and a detection apparatus including the detection element, wherein the cleaning apparatus includes: an attachment to which the detection apparatus including the detection element can be attached; a communication unit configured to communicate with the detection apparatus; a cleaning unit configured to clean the detection surface of the detection element; and a control unit configured to control a driving unit of the detection element included in the detection apparatus through the communication unit, wherein when cleaning by the cleaning unit, the control unit controls the position of the detection element by driving the driving unit through the communication unit, and wherein the detection apparatus includes: a driving unit capable of moving the position of the detection element; an attachment that can be attached to a cleaning apparatus; a communication unit configured to communicate with the cleaning apparatus; and a control unit configured to control the driving unit, wherein the control unit controls the driving unit by communicating with the cleaning apparatus through the communication unit in a state where the detection apparatus is attached to the cleaning apparatus by the attachment.

In order to solve the aforementioned problems, the present invention provides a method of controlling a cleaning apparatus, the cleaning apparatus including a cleaning unit configured to clean a detection surface of a detection element, an attachment to which a detection apparatus including the detection element can be attached, and a communication unit configured to communicate with the detection apparatus, the method comprising: controlling a driving unit of the detection element included in the detection apparatus through the communication unit, wherein when cleaning by the cleaning unit, the controlling controls the position of the detection element by driving the driving unit through the communication unit.

In order to solve the aforementioned problems, the present invention provides a method of controlling a detection apparatus, the detection apparatus including a detection element, a driving unit configured to drive the detection element, an attachment that can be attached to a cleaning apparatus, and a communication unit configured to communicate with the cleaning apparatus, the method comprising: controlling the driving unit, wherein in the controlling, the driving unit is controlled by communicating with the cleaning apparatus through the communication unit in a state where the detection apparatus is attached to the cleaning apparatus by the attachment.

In order to solve the aforementioned problems, the present invention provides an image capture apparatus comprising: a driving unit capable of moving the position of an image sensor; a setting unit configured to switch to one of a plurality of operating modes including a cleaning mode for cleaning the image sensor; and a control unit configured to, in the cleaning mode, control the driving unit to move the position of the image sensor so that an optical axis center of the image sensor shifts in a direction away from an optical center of a lens.

In order to solve the aforementioned problems, the present invention provides a method of controlling an image capture apparatus, the image capture apparatus including a driving unit capable of moving the position of an image sensor and a setting unit configured to switch to one of a plurality of operating modes including a cleaning mode for cleaning the image sensor, the method comprising: controlling, in the cleaning mode, the driving unit to move the position of the image sensor so that an optical axis center of the image sensor shifts in a direction away from an optical center of a lens.

In order to solve the aforementioned problems, the present invention provides a non-transitory computer-readable storage medium storing a program for causing a computer to execute a method of controlling a cleaning apparatus, the cleaning apparatus including a cleaning unit configured to clean a detection surface of a detection element, an attachment to which a detection apparatus including the detection element can be attached, and a communication unit configured to communicate with the detection apparatus, the method comprising: controlling a driving unit of the detection element included in the detection apparatus through the communication unit, wherein when cleaning by the cleaning unit, the controlling controls the position of the detection element by driving the driving unit through the communication unit.

In order to solve the aforementioned problems, the present invention provides a non-transitory computer-readable storage medium storing a program for causing a computer to execute a method of controlling a detection apparatus, the detection apparatus including a detection element, a driving unit configured to drive the detection element, an attachment that can be attached to a cleaning apparatus, and a communication unit configured to communicate with the cleaning apparatus, the method comprising: controlling the driving unit, wherein in the controlling, the driving unit is controlled by communicating with the cleaning apparatus through the communication unit in a state where the detection apparatus is attached to the cleaning apparatus by the attachment.

In order to solve the aforementioned problems, the present invention provides a non-transitory computer-readable storage medium storing a program for causing a computer to execute a method of controlling an image capture apparatus, the image capture apparatus including a driving unit capable of moving the position of an image sensor and a setting unit configured to switch to one of a plurality of operating modes including a cleaning mode for cleaning the image sensor, the method comprising: controlling, in the cleaning mode, the driving unit to move the position of the image sensor so that an optical axis center of the image sensor shifts in a direction away from an optical center of a lens.

According to the present invention, a cleaning task can be simplified, and a high cleaning performance can be achieved.

Further features of the present invention will become apparent from the following description of exemplary embodiments (with reference to the attached drawings).

BRIEF DESCRIPTION OF THE DRAWINGS

FIG. 1A is an external perspective view of a cleaning apparatus according to a first embodiment.

FIG. 1B is a perspective view illustrating the interior of the cleaning apparatus according to the first embodiment.

FIG. 1C is a rear view of the cleaning apparatus according to the first embodiment.

FIG. 10 is a flowchart illustrating an operation sequence in a cleaning mode of an image capture apparatus according to a second embodiment.

FIGS. 11A to 11D are diagrams illustrating operations in the cleaning mode according to the second embodiment.

DESCRIPTION OF THE EMBODIMENTS

Figure 2A:
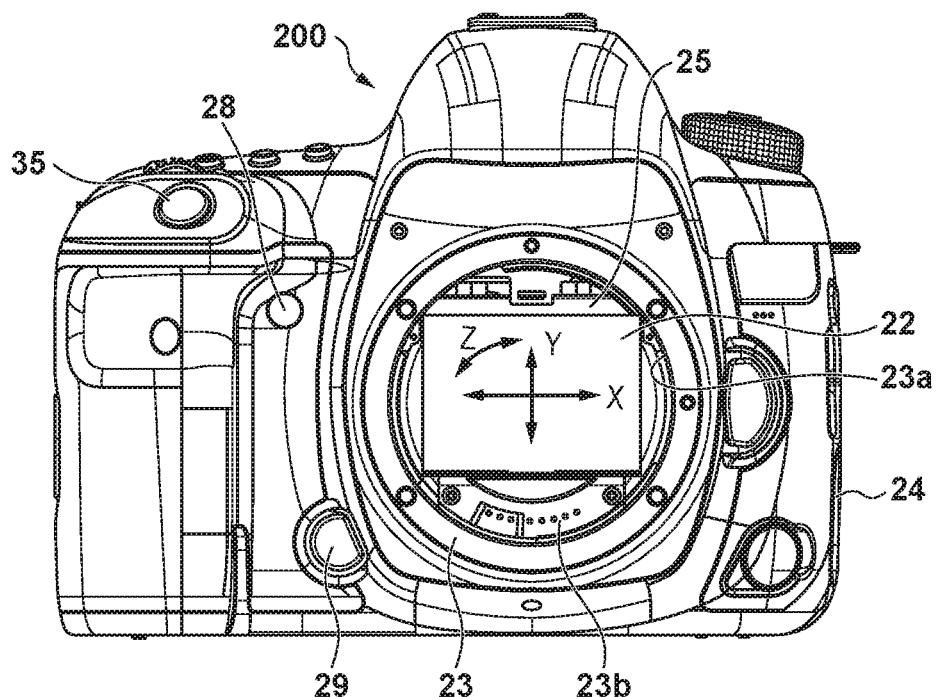
FIG. 2A is a front view of an image capture apparatus according to the first embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A first embodiment will be described hereinafter.

First, the configuration and functions of a cleaning apparatus according to the present embodiment will be described with reference to FIGS. 1A to 1C.

A cleaning apparatus 100 has a function for cleaning the detection surface of a detection element, which serves as an object to be cleaned, included in a detection apparatus, which serves as an apparatus to be cleaned. In the present embodiment, the cleaning apparatus 100 has a function for cleaning an image capturing surface of an image sensor (called a "part to be cleaned" hereinafter) included in an image capture apparatus ("camera" hereinafter) 200, for example.

As illustrated in FIG. 1A, the cleaning apparatus 100 includes a housing 1 constituted by a metal frame, a camera attachment 2 for attaching the camera 200, which is the apparatus to be cleaned, and a display unit 7, which displays various types of information. Note that the display unit 7 may be provided as a separate external apparatus communicatively connected to the cleaning apparatus 100.

As illustrated in FIG. 1B, the cleaning apparatus 100 includes a movable arm 6. A state confirmation unit 3, a first cleaning unit 4, and a second cleaning unit 5 are attached to the movable arm 6. The movable arm 6 is capable of translational motion in three-dimensional directions, as well as rotation, and thus the positions of the state confirmation unit 3, the first cleaning unit 4, and the second cleaning unit 5 can be varied. The movable arm 6 includes a translational movement mechanism capable of translational movement in the up and down directions, and can therefore approach and retract from the part to be cleaned with the camera 200 fixed to the camera attachment 2.

The camera attachment 2 is constituted by a metal member having an annular outer form, and is attached to an outer cover of the housing 1. The camera attachment 2 is a structure to which a lens attachment 23 of the camera 200 can be mounted and fixed. The lens attachment 23 is a part of the camera 20X), which is the apparatus to be cleaned in the present embodiment, to which an interchangeable lens can be attached. The camera attachment 2 includes a connection terminal 2b that is electrically connected to the lens attachment 23 of the camera 200, which makes it possible to communicate with the camera 200 attached to the camera attachment 2. The camera attachment 2 also includes an annular illumination unit that emits light for confirming the state of the part to be cleaned when that part is cleaned by the first cleaning unit 4 and the second cleaning unit 5, which makes it possible to monitor the state before and after cleaning by the cleaning apparatus 100. The camera attachment 2 can be removed from the housing 1 so that apparatuses having a variety of types, shapes, and so on can be attached for cleaning. The camera attachment 2 may therefore be replaceable in accordance with the type, shape, and so on of conceivable apparatuses to be cleaned, and a plurality of camera attachments 2, each having a different configuration for each type, shape, and so on of the apparatus to be cleaned, may be prepared in advance.

The cleaning apparatus 100 of the present embodiment detects that the camera 200 has been fixed to the camera attachment 2 on the basis of the communication state with a camera-side communication unit (connection terminal) 23b provided in the lens attachment 23 of the camera 200 to be cleaned. Specifically, the cleaning apparatus 100 determines that the camera 200 has been attached upon detecting that the connection terminal 2b of the camera attachment 2 has been electrically connected to the connection terminal 23b of the lens attachment 23.

The first cleaning unit 4 has a function for cleaning the part to be cleaned in a non-contact manner. In the present embodiment, the first cleaning unit 4 ejects air and uses air pressure to blow dust from the part to be cleaned.

The second cleaning unit 5 has a function for cleaning the part to be cleaned by making contact with the part to be cleaned. In the present embodiment, the second cleaning unit 5 captures dust adhering to the part to be cleaned using a wiping implement.

As illustrated in FIG. 1C, the cleaning apparatus 100 includes, within the housing 1, a control unit 10, an air filter 11, an intake port 12, a pressure meter 13, and a power source unit 14. When normal use, the outer cover is attached to the housing 1 so as to cover the components within the housing 1.

The control unit 10 has a microcomputer including a CPU, memory, and the like, and comprehensively controls the cleaning apparatus 100 as a whole by executing sequence programs stored in the memory.

The air filter 11 has a function for reducing the amount of dust, oil content, and the like in the air when air used in the cleaning operations by the first cleaning unit 4 is supplied from an external pump or the like through the intake port 12. The filtered air is then supplied to the first cleaning unit 4. If the air filter 11 is not used, there is a risk that dust present in the air will be blown onto the part to be cleaned.

The pressure meter 13 measures and displays the pressure of the air supplied through the intake port 12. A user can confirm the pressure by looking at the pressure meter 13, and can then adjust the pressure to an appropriate pressure.

The power source unit 14 supplies power to the components of the cleaning apparatus 100. Note that the cleaning apparatus 100 may be provided with a function for supplying power to an external device connected over an interface (the connection terminal 2b of the camera attachment 2, an external connection unit 17 (described later), or the like, in the present embodiment).

Figure 2B:
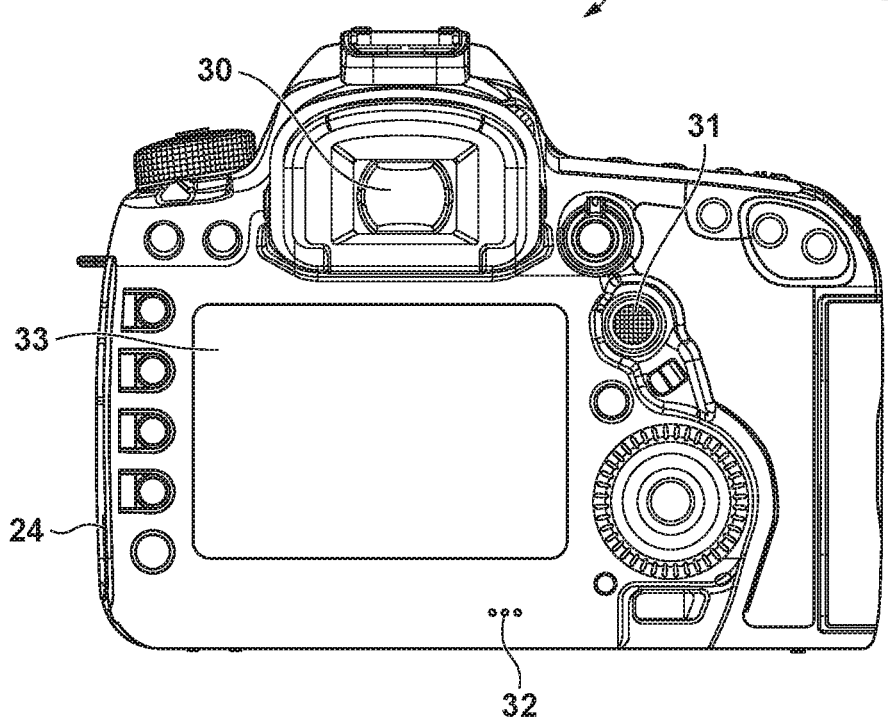
FIG. 2B is a rear view of the image capture apparatus according to the first embodiment.

The configuration and functions of the camera 200, which is the apparatus to be cleaned by the cleaning apparatus 100 in the present embodiment, will be described next with reference to FIGS. 2A and 2B.

The camera 200 according to the present embodiment is an interchangeable lens-type single-lens reflex digital camera, to which an interchangeable lens (not shown) can be attached.

The camera 200 includes an external connection unit 24, which is an interface for connecting an external device, on a side part of the camera body. The external connection unit 24 is provided in the side part of the camera body so as to be covered by a cover, and has a connection terminal compliant with a predetermined interface standard (e.g., Universal Serial Bus (USB)). When the external device is the cleaning apparatus 100, the camera 200 can exchange data and power with the cleaning apparatus 100 by the external connection unit 24 being electrically connected to the external connection unit 17 of the cleaning apparatus 100 over a cable or the like.

The lens attachment 23, to which an interchangeable lens (not shown) can be attached, is provided near the center of the front surface of the camera body. A plurality of the connection terminals 23b are provided on the inner side of the lens attachment 23. When the interchangeable lens is fixed to the lens attachment 23, the camera-side connection terminals 23b are electrically connected to lens-side connection terminals (not shown) provided in the interchangeable lens, and the camera 200 and interchangeable lens exchange data, supply power, and so on.

The lens attachment 23 has an opening 23a for allowing outside light to enter. An image sensor 22, the camera-side communication unit (connection terminal) 23b, a mirror 25, and a shutter 26 are arranged on the inner side of the opening 23a.

The image sensor 22 is disposed so that the first and second cleaning units 4 and 5 can make contact with or approach the image sensor 22 through the opening 23a of the lens attachment 23, and has an image capturing surface 20 that receives light beams from an object while the interchangeable lens is fixed to the camera body. A CMOS image sensor or the like, which generates image data by receiving object light and converting the object light into electrical signals, is used as the image sensor 22. Note that the image sensor 22 of the present embodiment is not limited to a CMOS sensor, and a variety of sensor types, such as CCD or CID types, may be employed instead. The image sensor 22 has a structure in which a cover glass, an IR removal filter, an LPF, and the like are stacked upon photodiodes in the thickness direction, and thus the uppermost surface thereof serves as the part to be cleaned. The light beams received by the image sensor 22 are converted into electrical signals and output as image data.

The mirror 25 is arranged further on the object side than the image sensor 22. A mirror driving mechanism (not shown) can move the mirror 25 between a "down" position, in which the mirror 25 is located in the optical axis of the image sensor 22, and an "up" position, in which the mirror 25 is retracted from the optical axis. When shooting preparations, the mirror 25 is moved to the "down" position so as to reflect or divide light incident on the image sensor 22 and conduct the light to elements aside from the image sensor 22, such as a photometry sensor (not shown) or an optical viewfinder 30. When capturing an image, the mirror 25 is moved to the "up" position, and the image capturing surface 20 of the image sensor 22 is exposed to the light beams from the object. FIG. 2A illustrates a state where the mirror 25 is in the "up" position. Additionally, when cleaning the image sensor 22, the mirror 25 is moved to the "up" position, at least to an extent where the part to be cleaned can be approached or contacted through the opening 23a of the lens attachment 23.

The shutter 26 is a light-shielding mechanism that controls the exposure time of the image sensor 22 when capturing an image, and is arranged further on the object side than the image sensor 22. The shutter 26 includes a pair of shutter curtains, i.e., a front curtain that travels for lighting at the start of exposure and a rear curtain that travels so as to shield light at the end of the exposure. The exposure time is adjusted by controlling the timing at which the shutter curtains travel. FIG. 2A illustrates a state in which only the front curtain has traveled and the image sensor 22 is exposed, and thus the shutter curtains are not illustrated.

A light-emitting unit 28 is provided above and to the side of the lens attachment 23, in the front surface of the camera body. The light-emitting unit 28 includes an LED and the like, and is used to provide fill-in light for autofocus (AF), indicate a countdown when shooting using the self-timer, and the like.

An operation button 29 is a pushbutton-type operation member provided below and to the side of the lens attachment 23, in the front surface of the camera body.

A multi-controller 31 is a joystick-type operation member, provided above and to the side of a display unit 33 in the rear surface of the camera body, which can be moved up and down, left and right, and diagonally.

A shutter button 35 is a pushbutton-type operation member that accepts a shooting instruction from the user. The shutter button 35 turns on to generate a first shutter switch signal SW1 when the shutter button 35 is operated halfway, that is, half-pressed (a shooting preparation instruction). Upon receiving the first shutter switch signal SW1, a camera control unit 21 controls the image sensor 22, the shutter 26, a lens and aperture stop (not shown), and the like to start shooting preparation operations such as autofocus (AF) processing, automatic exposure (AE) processing, auto white balance (AWB) processing, flash pre-emission (EF) processing, and the like. In addition, the shutter button 35 turns on to generate a second shutter switch signal SW2 when the shutter button 35 is operated completely, that is, fully-pressed (the shooting instruction). Upon receiving the second shutter switch signal SW2, the camera control unit 21 starts a sequence of shooting operations, from reading out signals from the image sensor 22 to writing image data into a recording medium (not shown).

Although the following second embodiment will describe an example in which the aforementioned operation members 29 and 31 are used as input devices when cleaning the image sensor 22, the camera 200 includes many other operation members as well (e.g., a power switch), and the operation members are not limited to those described here.

An audio output unit 32, such as a speaker for outputting operation sounds, alarms, audio, and the like, as well as the display unit 33, which displays images, are arranged in the rear surface of the camera body. The display unit 33 includes a display panel such as an organic EL or liquid crystal panel. The camera control unit 21, which controls the aforementioned components, a battery 34, such as a secondary battery that supplies power, and so on are arranged within the camera body.

Although the present embodiment describes an example of a single-lens reflex camera including the mirror 25, a mirrorless single-lens camera which does not have an optical viewfinder (mirror) may be employed as well.

Figure 3A:
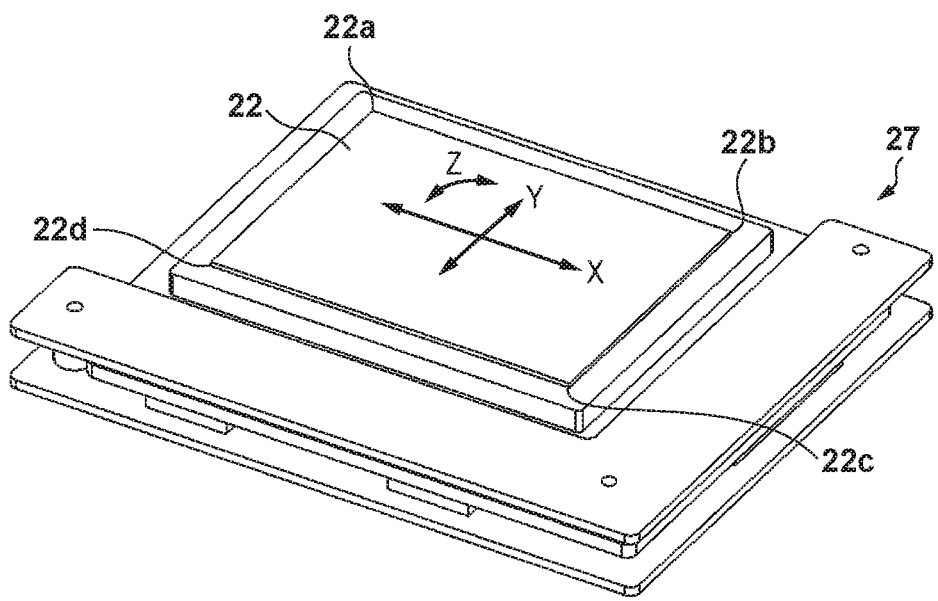
FIG. 3A is a perspective view illustrating the configuration of an image sensor driving mechanism according to the first embodiment.
Figure 3B:
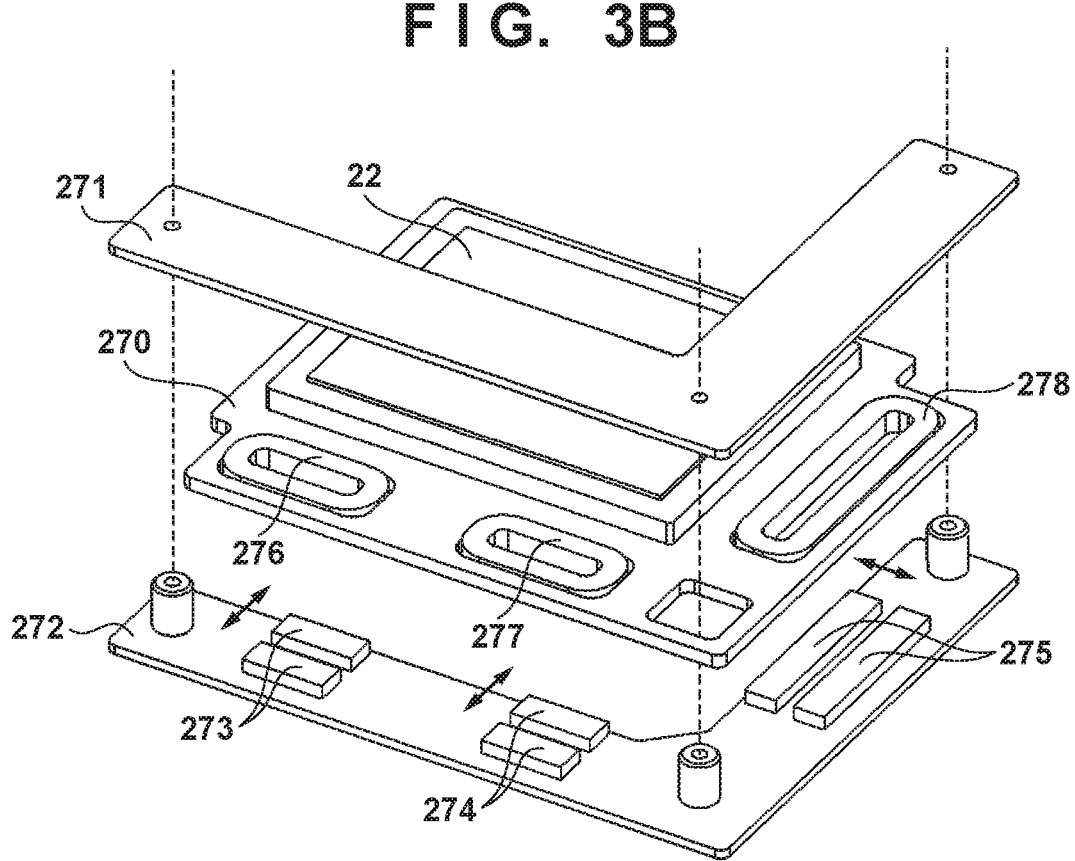
FIG. 3B is an exploded perspective view illustrating the configuration of the image sensor driving mechanism according to the first embodiment.
Figure 3C:
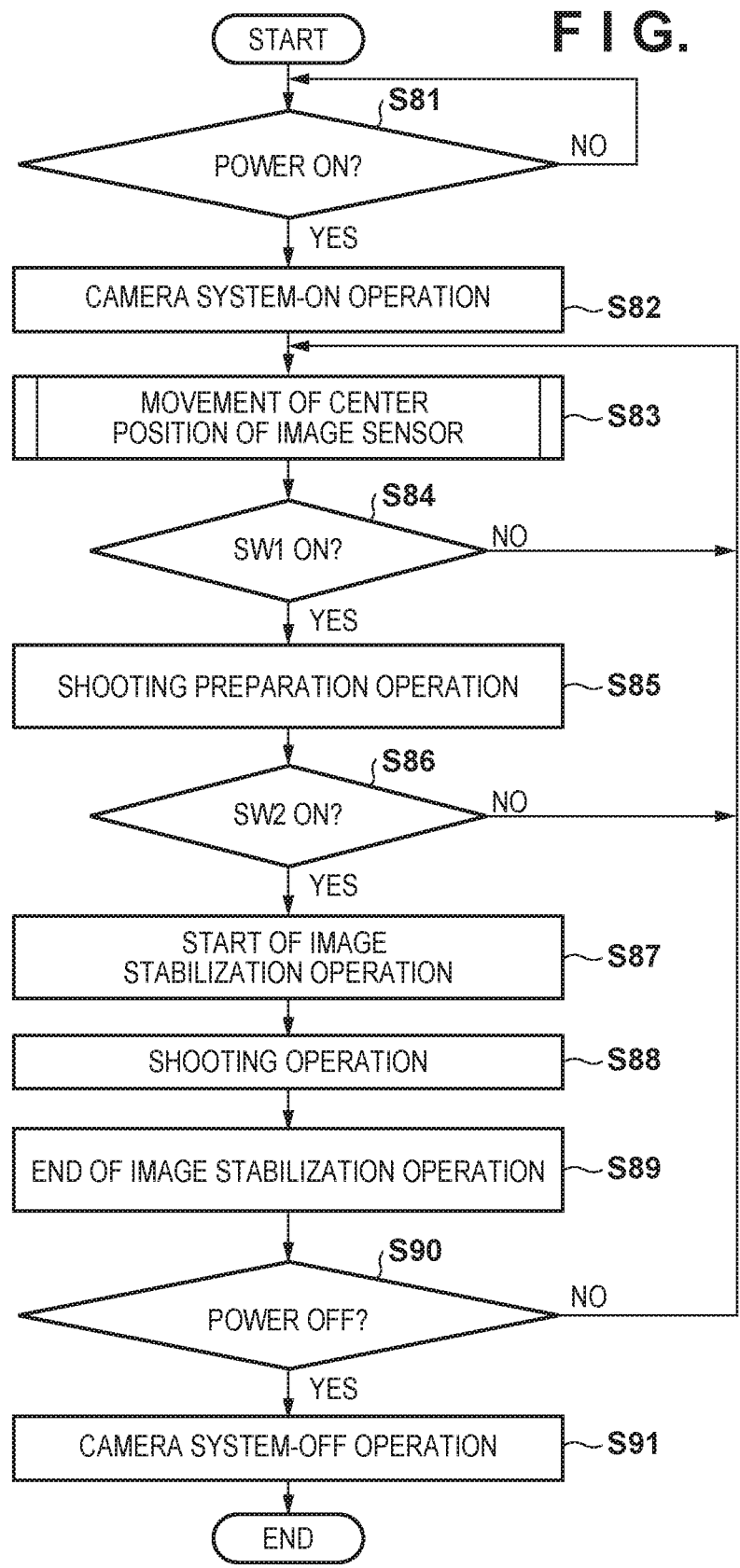
FIG. 3C is a flowchart illustrating a shooting sequence carried out when an anti-vibration function that uses the image sensor driving mechanism is on, according to the first embodiment.

The configuration and functions of an image sensor driving mechanism according to the present embodiment will be described next with reference to FIGS. 3A to 3C.

An image sensor driving mechanism 27 is provided within the camera body. In a shooting mode where an anti-vibration function is turned on, the image sensor driving mechanism 27 is controlled in accordance with an anti-vibration instruction from the camera control unit 21, and is driven to shift the image sensor 22 by a shift amount calculated by the camera control unit 21 thereby executing the anti-vibration control by the image sensor (image stabilization). In the present embodiment, the position of the image sensor 22 can be moved in a second cleaning sequence, a manual cleaning mode, and so on, which will be described later. The image sensor driving mechanism 27 includes a movable table 270 on which the image sensor 22 is arranged. The movable table 270 includes a first driving coil 276, a second driving coil 277, and a third driving coil 278, which are arranged in the periphery of the area where the image sensor 22 is arranged. The movable table 270 is arranged so that an L-shaped upper yoke 271 and lower yoke 272, which are magnetic bodies, enclose the first driving coil 276, the second driving coil 277, and the third driving coil 278 from the front and rear sides.

A first driving magnet 273, a second driving magnet 274, and a third driving magnet 275 are arranged in the lower yoke 272 in positions that face the first driving coil 276, the second driving coil 277, and the third driving coil 278, respectively. The movable table 270 supports the first driving coil 276, the second driving coil 277, and the third driving coil 278 in a floating state with respect to the lower yoke 272, without being in contact with the first driving magnet 273, the second driving magnet 274, and the third driving magnet 275, respectively. By controlling the electrification of the first driving coil 276, the second driving coil 277, and the third driving coil 278, electromagnetic force can be produced with the first driving magnet 273, the second driving magnet 274, and the third driving magnet 275, which makes it possible to move the image sensor 22. Magnetic fluxes can be used effectively by arranging the magnets and the coils between the upper yoke 271 and the lower yoke 272 as in the present embodiment. The camera control unit 21 controls the electrification of the first driving coil 276, the second driving coil 277, and the third driving coil 278, and moves the image sensor 22 within a predetermined range, in X and Y directions parallel to the image capturing surface 20 as indicated in FIG. 3A and in a Z direction about an optical axis (normal line) perpendicular to the image capturing surface 20. This realizes image stabilization, a function for shaking off dust, and the like.

A shooting sequence carried out by the camera 200 using the image sensor driving mechanism 27 of the present embodiment will be described next with reference to FIG. 3C. The following assumes that the camera 200 was in the shooting mode the last time the power switch was turned on, and that image stabilization is turned on.

In step S81, the camera control unit 21 determines whether or not the power switch of the camera 200 is on. The determination of step S81 is repeated until the power switch is turned on. Once the user turns the power switch on and the camera 200 turns on, the process moves to step S82.

In step S82, the camera control unit 21 executes a process for starting up the camera system (system-on operations). In the system-on operations, power is supplied to the various circuits in the camera system, and initial system settings are made, processing for enabling shooting operations is carried out, and the like. Additionally, in step S82, communication is carried out with the control circuitry of the attached lens when shooting so as to acquire lens information stored in memory provided in the lens, such as information of the position of the center of the image circle, information of the diameter of the image circle, and so on unique to that lens unit. The acquired information is stored in the memory of the camera control unit 21.

In step S83, the camera control unit 21 acquires the state of the camera system, and on the basis of the acquired system state, uses the lens information acquired in step S82 to calculate a position to serve as a reference (a reference position) when executing the anti-vibration control by the image sensor 22. Then, in response to a control signal from the camera control unit 21, the image sensor driving mechanism 27 carries out electrification control by controlling the electrification of the first driving coil 276, the second driving coil 277, and the third driving coil 278. Through this, the image sensor 22 is moved so that the center position of the image sensor 22 coincides with the reference position.

In step S84, the camera control unit 21 determines whether or not the first shutter switch signal SW1 has been turned on by the shutter button 35 being pressed halfway. The camera control unit 21 moves the process to step S85 if it is determined that the first shutter switch signal SW1 has turned on, and returns the process to step S83 if it is determined that the first shutter switch signal SW1 has not turned on.

In step S85, the camera control unit 21 carries out the shooting preparation operations.

In step S86, the camera control unit 21 determines whether or not the second shutter switch signal SW2 has been turned on by the shutter button 35 being fully pressed. The camera control unit 21 moves the process to step S87 if it is determined that the second shutter switch signal SW2 has turned on, and returns the process to step S83 if it is determined that the second shutter switch signal SW2 has not turned on.

In step S87, the camera control unit 21 starts image stabilization operations. Specifically, in response to a control signal from the camera control unit 21, the image sensor driving mechanism 27 moves the image sensor 22 in the direction opposite from the direction of image blur, caused by the user's hand shaking or the like, by controlling the electrification of the first driving coil 276, the second driving coil 277, and the third driving coil 278. This realizes the image stabilization operations.

In step S88, the camera control unit 21 starts shooting operations, and when the shooting operations end, the image stabilization operations end in step S89. This completes the sequence of shooting operations.

In step S90, the camera control unit 21 determines whether or not the power switch of the camera 200 has been turned off with the camera system in a standby state. The process returns to step S83 if the power switch has not been turned off, and moves to step S91 if the power switch has been turned off.

In step S91, the camera control unit 21 carries out a process for ending the operations of the circuits in the camera system, stores necessary information and the like in the memory of the camera control unit 21, and cuts the supply of power to the circuits (system-off operations).

The configuration of a system in which the camera 200, which is the apparatus to be cleaned, is connected to the cleaning apparatus 100 of the present embodiment, will be described next with reference to FIGS. 1A to 2B.

The lens attachment 23 of the camera 200 is attached to the camera attachment 2 of the cleaning apparatus 100. The control unit 10 of the cleaning apparatus 100 can control the camera 200 by communicating with the camera control unit 21 via the external connection unit 17 of the cleaning apparatus and the external connection unit 24 of the camera 200. For example, the cleaning apparatus 100 can determine the model of the camera 200, control operations such as image capturing operations for driving the mirror 25, the shutter 26, and the like of the camera 200, and so on.

In FIG. 1B, the second cleaning unit 5 is facing the camera attachment 2. The movable arm 6 has the translational movement mechanism for up and down translational movement, and thus the second cleaning unit 5 can approach the image sensor 22, with the camera 200 in a fixed state, through the central opening of the camera attachment 2.

The movable arm 6 also has a rotation mechanism, and the state confirmation unit 3, the first cleaning unit 4, and the second cleaning unit 5 are arranged in positions corresponding to different phases around the axis of rotation thereof. Like the second cleaning unit 5, this rotation mechanism makes it possible to rotationally drive the state confirmation unit 3 and the first cleaning unit 4 to a position facing the camera attachment 2 (i.e., the image capturing surface 20 of the image sensor 22).

Additionally, in the cleaning sequence that will be described later, the rotation mechanism of the movable arm 6 is used to control the tilt (angle) of the first cleaning unit 4 and the second cleaning unit 5 relative to the image capturing surface 20. In other words, the tilt of an ejection port is controlled when the first cleaning unit 4 ejects air onto the image capturing surface 20, the tilt of the wiping implement (and core) is controlled when the second cleaning unit 5 wipes off the image capturing surface 20, and so on, under the control of the control unit 10. As such, using the translational movement mechanism and rotation mechanism of the movable arm 6, the control unit 10 can cause the first and second cleaning units 4 and 5 to face the camera attachment 2, i.e., the image capturing surface 20 of the image sensor 22, extend and retract the cleaning units, and so on, so as to control the distance to the image capturing surface 20.

The state confirmation unit 3 includes an illumination unit, which illuminates the part to be cleaned with light under the control of the control unit 10. The state confirmation unit 3 includes an LED, and can acquire an image for confirming the state of dirtiness of the image capturing surface 20 of the image sensor 22 by capturing an image of the image capturing surface 20 while illuminating the image capturing surface 20 from nearby. In the present embodiment, an image of the image capturing surface is acquired using the image capturing function of the image sensor 22. However, the configuration is not limited thereto. The state confirmation unit 3 may have an image capturing function, and information making it possible to confirm the state of the image capturing surface 20 before and after cleaning may be acquired. Additionally, in the present embodiment, the state confirmation unit 3 is attached to the movable arm 6 along with the first cleaning unit 4 and the second cleaning unit 5. However, the state confirmation unit 3 may be arranged near the camera attachment 2, for example. Using such an arrangement makes it possible to confirm the states of the first and second cleaning units 4 and 5 when cleaning, in addition to the state of the image capturing surface 20 of the image sensor 22. Additionally, an illumination unit and/or an image capturing unit may be provided as the state confirmation unit 3 near the cleaning members of the first cleaning unit 4 and the second cleaning unit 5 (the ejection port, the wiping implement).

The first cleaning unit 4 uses air pressure to blow away dust adhering to the image capturing surface 20 of the image sensor 22 which the first cleaning unit 4 is near, by ejecting air from the tip (ejection port) of a cylindrical member. Furthermore, in the present embodiment, the first cleaning unit 4 includes an ionizer that charges the air to give the air a neutralizing function, in order to neutralize and separate the dust adhering to the image capturing surface 20 of the image sensor 22. Note that even without a neutralizing function, simply blowing the air has a certain effect, and thus the ionizer is not absolutely necessary.

The second cleaning unit 5 is a wiping implement attached mainly to the tip of a core, and captures dust by sliding directly against the image capturing surface 20 of the nearby image sensor 22. The wiping implement uses microfiber cloth, paper, tape, or the like in roll form, so that the second cleaning unit 5 wipes the part to be cleaned by making contact with the surface and moving, and a new wiping implement then makes contact with the part to be cleaned. Furthermore, in the present embodiment, the wiping implement may be immersed in a solvent to remove oil as necessary.

As long as the first cleaning unit 4 and the second cleaning unit 5 are a non-contact type cleaning member and a contact-type cleaning member, respectively, the specific configurations thereof are not particularly limited.

Figure 4:
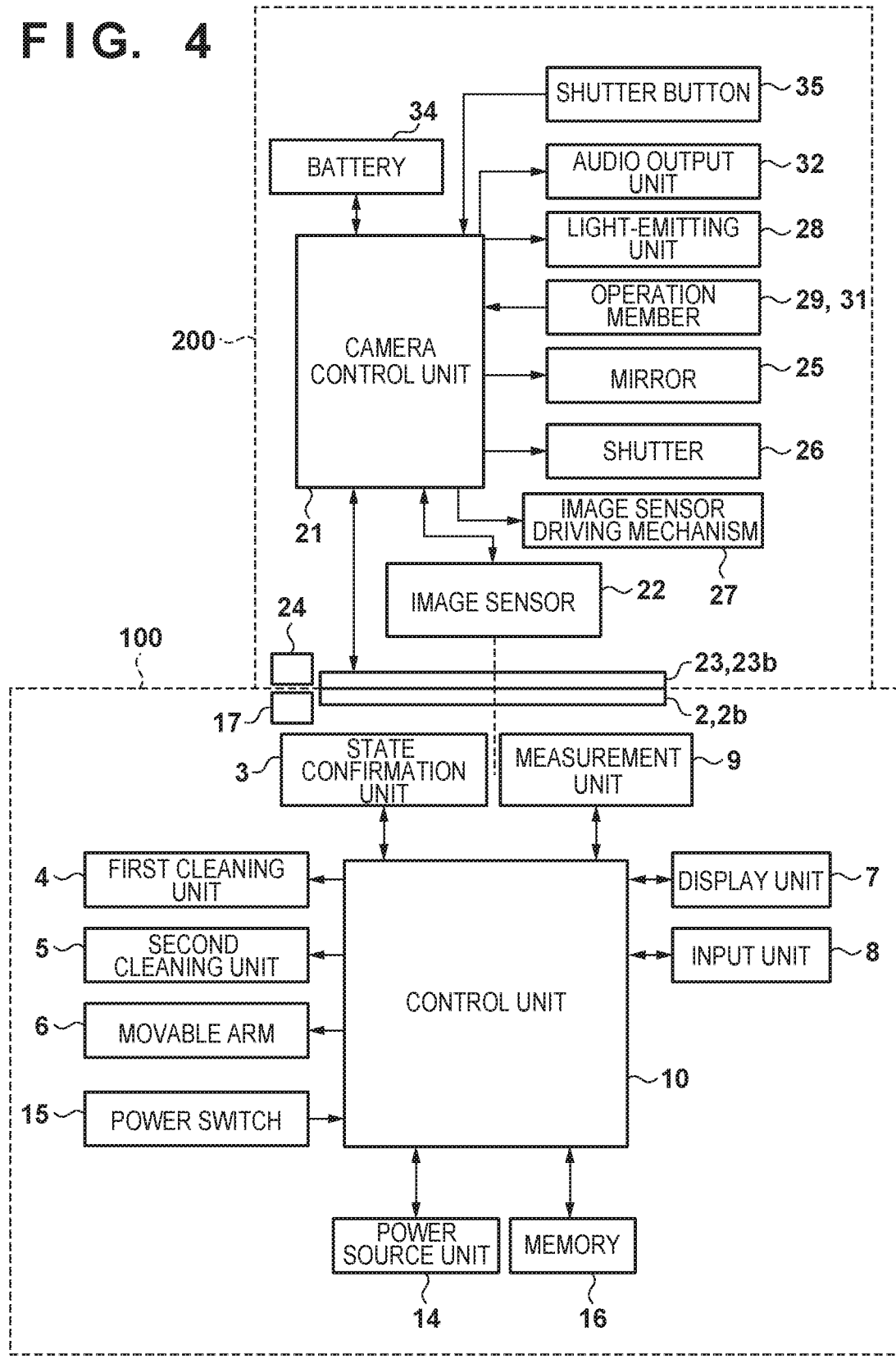
FIG. 4 is a block diagram illustrating the configuration of the cleaning apparatus and the image capture apparatus according to the first embodiment.

The function block configurations of the cleaning apparatus 100 and the camera 200 according to the present embodiment will be described next with reference to FIG. 4.

First, the configuration and functions of the cleaning apparatus 100 will be described.

The cleaning apparatus 100 operates under power supplied from the power source unit 14, and the power is switched on and off using a power switch 15.

The display unit 7 displays various types of information of the cleaning apparatus 100 and the camera 200, various types of information in response to instructions from the control unit 10, such as operation states, settings made through user operations, a guide for user operations, and the like.

An input unit 8 is used to input information pertaining to the apparatus to be cleaned, which is stored in memory 16 or acquired through the external connection unit 17 or another communication device, so that correct operations can be carried out in accordance with the apparatus to be cleaned which is fixed to the camera attachment 2. The input unit 8 is also used to input information of various types of instructions made through user operations. In the present embodiment, it is assumed that information pertaining to the model, specifications, or the like of the camera 200 is acquired through the input unit 8 as the information of the apparatus to be cleaned.

A measurement unit 9 includes a lasing rangefinder or the like, for example, and measures the position (coordinates, distance to the image sensor, and so on), the size, and the like of the image sensor 22 of the camera 200 fixed to the camera attachment 2. If the model information of the camera 200 is set and a corresponding sequence program is stored in the memory 16, it is not absolutely necessary to provide the measurement unit 9 and measure the position, size, and so on.

The control unit 10 has a microcomputer including a CPU, memory, and the like, and comprehensively controls the cleaning apparatus 100 as a whole, such as processing information from the components and making instructions to the components, by executing sequence programs stored in the memory 16.

When the camera 200 is fixed to the camera attachment 2, the connection terminal 2b of the camera attachment 2 is electrically connected to the connection terminal 23b of the lens attachment 23, and the control unit 10 can therefore detect that the camera 200 has been attached to the cleaning apparatus 100.

The external connection unit 17 is an interface for connecting to an external device. The external connection unit 17 includes a connection terminal compliant with a predetermined interface standard (e.g., USB). When the external device is the camera 200, the cleaning apparatus 100 exchanges data with and supplies power to the camera 200 by the external connection unit 17 being electrically connected to the external connection unit 24 of the camera 200 over a cable or the like. Note that the standard for the communication between the cleaning apparatus 100 and the camera 200 is not limited to USB. Another communication standard can be applied, such as wired LAN, HDMI®, or wireless LAN (Wi-Fi®, Bluetooth®, BLE (Bluetooth® Low Energy)).

Next, the configuration and functions of the camera 200 attached to the cleaning apparatus 100 will be described.

The camera control unit 21 has a microcomputer including a CPU, memory, and the like, and comprehensively controls the camera 200 as a whole by executing control programs stored in the memory. The camera control unit 21 controls the following, for example: light emission by the light-emitting unit 28; inputs from the operation members 29 and 31; driving the image sensor 22, the mirror 25, and the shutter 26 when shooting; displays made in the optical viewfinder 30 and the display unit 33; the shooting/recording/playback of images; control pertaining to data communication; and control of the image sensor driving mechanism 27 (described later). The configurations and functions of the image sensor 22, the mirror 25, the shutter 26, the light-emitting unit 28, and the operation members 29 and 31 are as described earlier.

A sequence of operations carried out by the cleaning apparatus 100 when cleaning will be described next with reference to FIGS. 5A to 5C.

Figure 5A:
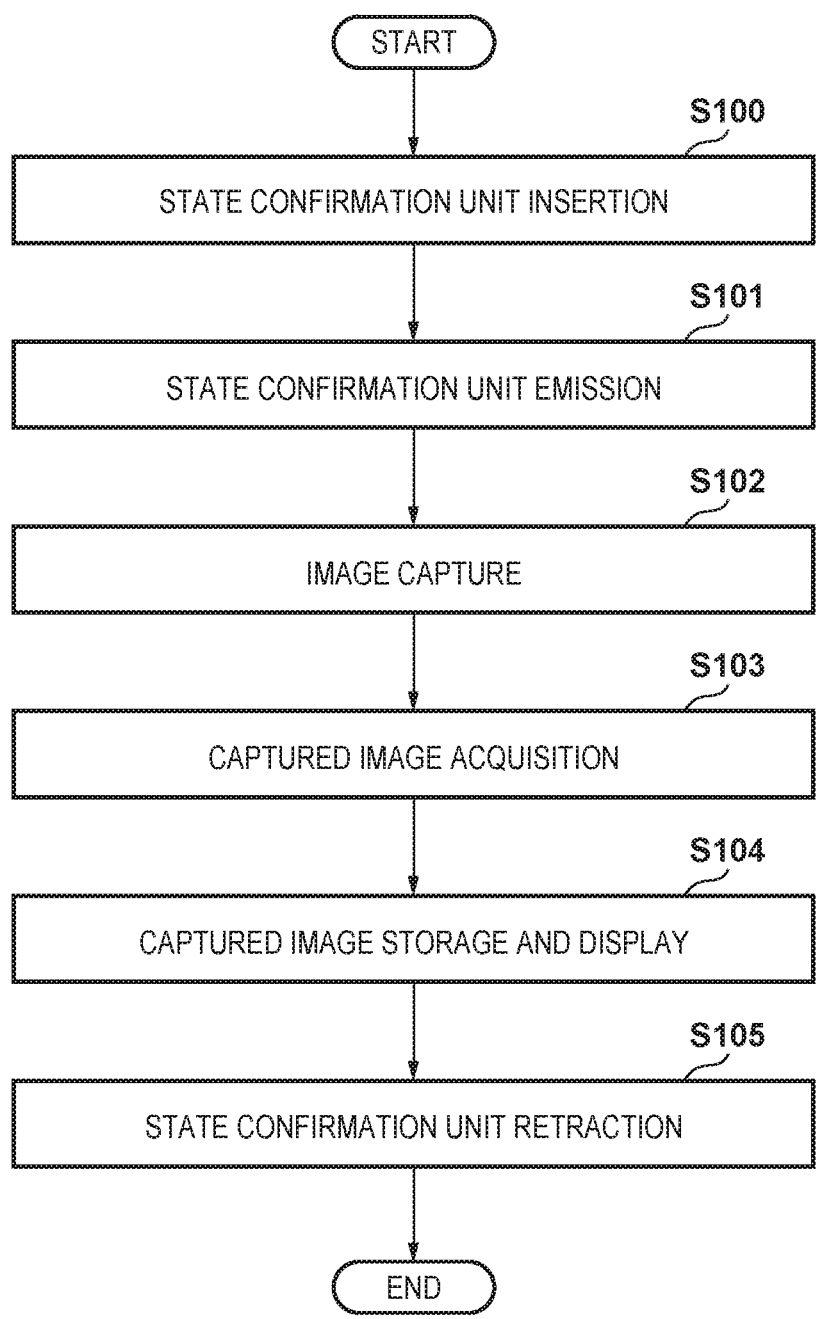
FIGS. 5A to 5C are flowcharts illustrating an operation sequence carried out by the cleaning apparatus according to the first embodiment.
Figure 5B:
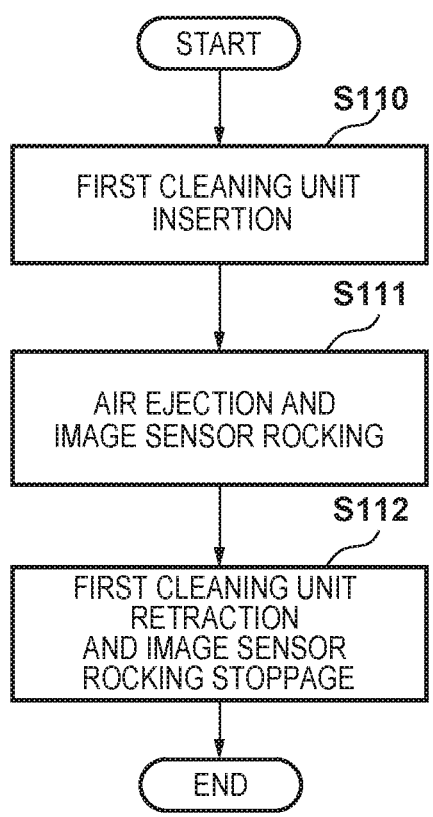

FIG. 5A illustrates a confirmation sequence for using the state confirmation unit 3 to confirm the state of the part to be cleaned (the state of dirtiness, the cleaning state).

In the overall sequence carried out by the cleaning apparatus 100, the control unit 10 carries out the operations of the flow, or instructs operations to be carried out, as appropriate. At the point in time when the confirmation sequence starts, the camera 200 is already fixed to the camera attachment 2, and the cleaning apparatus 100 is thus communicatively connected to the camera 200. The same applies to the first cleaning sequence illustrated in FIG. 4B and the second cleaning sequence illustrated in FIG. 4C, which will be described later.

In step S100, the control unit 10 controls the movable arm 6 to face the state confirmation unit 3 toward the camera attachment 2, move the state confirmation unit 3 through the camera attachment 2 and the lens attachment 23, and bring the tip of the state confirmation unit 3 toward the image sensor 22.

In step S101, the control unit 10 controls the state confirmation unit 3 so as to illuminate the image sensor 22 by emitting light from a point light source such as an LED, while near the image sensor 22. The illumination is not limited to a point light source, and other light sources can be employed. However, a point light source makes it easier for uniform light to be incident on each pixel, and the state of the image capturing surface 20 can therefore be measured under substantially identical conditions.

In steps S102 and S103, with the state confirmation unit 3 still illuminating the image sensor 22, the control unit 10 sends a control signal to the camera control unit 21 through the external connection unit 17 and the external connection unit 24, which causes the image sensor 22 to carry out image capturing operations and acquire an image.

In step S104, the control unit 10 stores the image acquired in step S103 in the memory 16 through the external connection unit 17, converts the image into an image for display, and displays that image in the display unit 7. Here, the control unit 10 detects the state of the image capturing surface and information of dust, dirtiness, and the like from the captured image, using known image analysis such as singular point detection, and displays that state and information in the display unit 7 along with the image. Furthermore, in the present embodiment, the initial state of the image capturing surface is confirmed, the cleaning is determined to be complete after the cleaning, a comparison of before and after the cleaning is provided, and so on on the basis of this information. In the present embodiment, providing the comparison between before and after the cleaning can be performed through the display unit 7 as a confirmation result, in the confirmation sequence following the cleaning, and thus the user can be notified of the cleaning effects, remaining dust, and the like.

In step S105, the control unit 10 controls the movable arm 6 to retract the state confirmation unit 3 from the image sensor 22. This ends the confirmation sequence.

FIG. 4B illustrates a first cleaning sequence carried out by the first cleaning unit 4.

In step S110, the control unit 10 controls the movable arm 6 to face the first cleaning unit 4 toward the camera attachment 2, move the first cleaning unit 4 through the camera attachment 2 and the lens attachment 23, and bring the ejection port of the first cleaning unit 4 toward the image sensor 22.

In step S111, the control unit 10 controls the first cleaning unit 4 to eject air from the ejection port in the vicinity of the image sensor 22, and controls the image sensor driving mechanism 27 of the camera 200 to rock the image sensor 22. Here, a method of cleaning using the first cleaning unit 4 will be described with reference to FIGS. 7A and 7B.

Figure 7A:
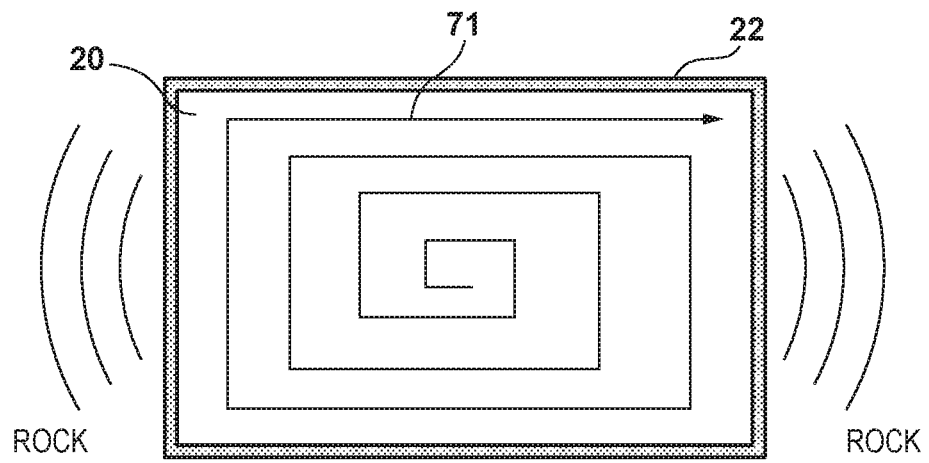
FIGS. 7A and 7B are diagrams illustrating a first cleaning sequence according to the first embodiment.
Figure 7B:
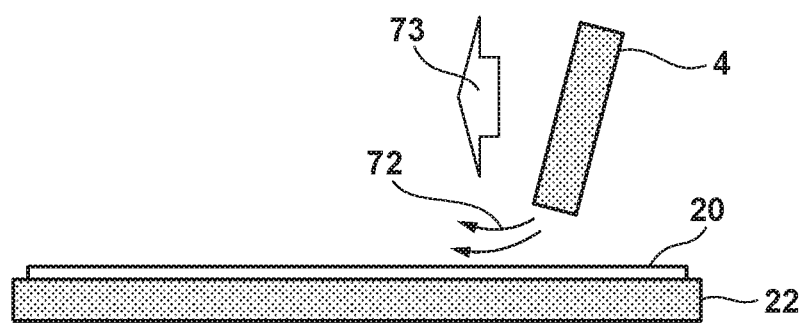

FIGS. 7A and 7B are a front view and a side view, respectively, of the image capturing surface 20 of the image sensor 22, when the first cleaning unit 4 has approached the image capturing surface 20 of the image sensor 22 and is ejecting air thereon.

As illustrated in FIG. 7A, the control unit 10 controls the movable arm 6, and causes the first cleaning unit 4 to move along a movement trajectory 71 relative to the image capturing surface 20 of the image sensor 22 while ejecting air. During the movement, the first cleaning unit 4 is controlled to eject the air in a travel direction 73, as illustrated in FIG. 7B. The movement trajectory 71 is set to start in the center of the image capturing surface 20 of the image sensor 22, and spiral outward therefrom. The image sensor 22 is rocked while air is being ejected. By setting a movement trajectory and rocking the image sensor 22 while blowing air in this manner, the dust adhering to the image capturing surface 20 can be blown off to the side of the image sensor 22, and dust that has been blown off can be prevented from adhering to the image capturing surface 20 again. Furthermore, by moving the first cleaning unit 4 while tilted so that the air is ejected in the travel direction 73, the effect of blowing dust off of the image sensor 22 can be further increased. This also makes it possible to move the first cleaning unit 4 while avoiding the shutter 26 located near the image sensor 22.

In this manner, the first cleaning unit 4 can remove comparatively large pieces of dust, dust, and the like, which have adhered to the image capturing surface 20 of the image sensor 22, by ejecting air onto that surface. If, for example, the image capturing surface 20 is cleaned by sliding the second cleaning unit 5 thereon without first removing large pieces of dust from the image capturing surface 20, the dust may be dragged by the second cleaning unit 5 and damage the surface. However, using the first cleaning unit 4 to remove the dust without making contact ensures that the dust is not dragged along the image capturing surface 20, which makes it less likely that the surface will be scratched or the like.

Additionally, in the present embodiment, in the first cleaning sequence, the control unit 10 controls the movable arm 6 so that the first cleaning unit 4 does not make contact with the image capturing surface 20 of the image sensor 22. This makes it possible to further reduce the likelihood that the image capturing surface 20 of the image sensor 22 will be damaged.

In step S112, the control unit 10 controls the movable arm 6 to retract the first cleaning unit 4 from the image sensor 22 and controls the image sensor driving mechanism 27 of the camera 200 to stop rocking the image sensor 22. This ends the first cleaning sequence.

Figure 5C:
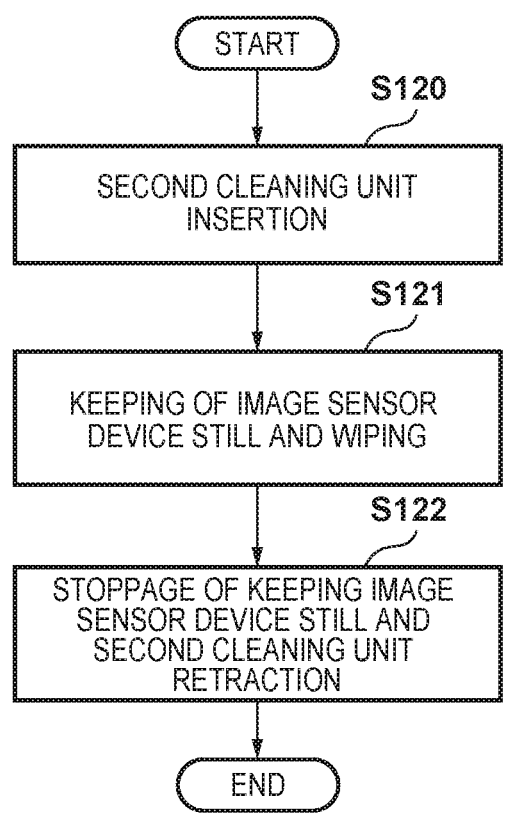

FIG. 5C illustrates the second cleaning sequence carried out by the second cleaning unit 5.

In step S120, the control unit 10 controls the movable arm 6 to face the second cleaning unit 5 toward the camera attachment 2, move the second cleaning unit 5 through the camera attachment 2 and the lens attachment 23, and bring the wiping implement of the second cleaning unit 5 toward the image sensor 22. Here, if a solvent for removing oil or the like from the wiping implement is used, the movable arm 6 is first controlled to immerse the wiping implement of the second cleaning unit 5 in a receptacle containing the solvent, which is provided in another rotational position. The second cleaning unit 5 is then faced toward the camera attachment 2.

In step S121, the control unit 10 controls the image sensor driving mechanism 27 of the camera 200 to keep the image sensor 22 still, and controls the movable arm 6 to bring the wiping implement of the second cleaning unit 5 into contact with and wipe the image sensor 22. As such, the image sensor 22 does not move due to friction with the wiping implement when the cleaning by the second cleaning unit 5, which increases an effect of suppressing parts unwiped or unevenly-wiped by the cleaning apparatus 100. Here, a method of cleaning using the second cleaning unit 5 will be described with reference to FIGS. 8A and 8B.

Figure 8A:
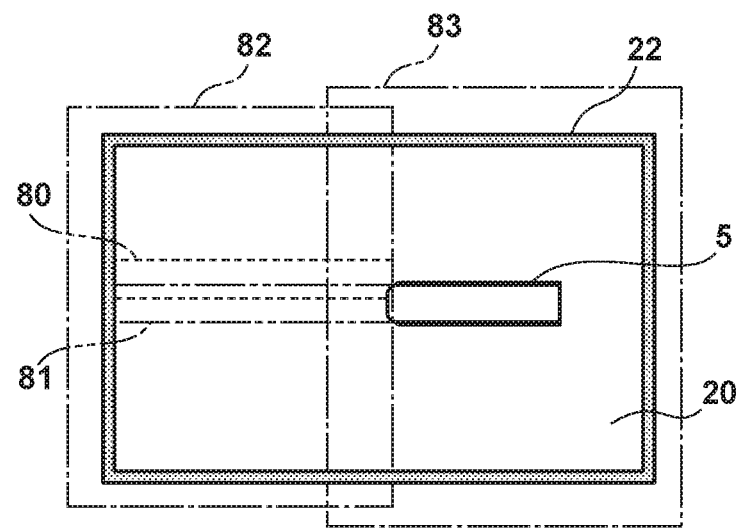
FIGS. 8A and 8B are diagrams illustrating a second cleaning sequence according to the first embodiment.
Figure 8B:
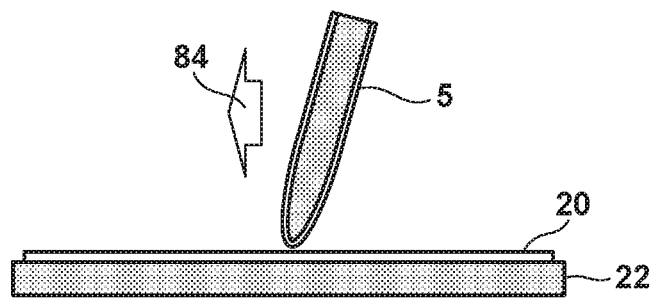

FIGS. 8A and 8B are a front view and a side view, respectively, of the image capturing surface 20 of the image sensor 22, when the second cleaning unit 5 is in contact with the image capturing surface 20 of the image sensor 22 and is wiping that surface.

As illustrated in FIG. 8A, the control unit 10 controls the movable arm 6 to move the second cleaning unit 5 relative to the image capturing surface 20 of the image sensor 22, and wipe the image capturing surface 20 using the wiping implement. During this movement, the second cleaning unit 5 is controlled to move while contacting the image capturing surface 20, with the second cleaning unit 5 tilted in the direction opposite from a travel direction 84, as illustrated in FIG. 8B.

The second cleaning unit 5 carries out the wiping by progressively scanning the cleaning area, as indicated by a first movement trajectory 80 and a second movement trajectory 81 indicated in FIG. 8A, while ensuring that the trajectories partially overlap. Furthermore, unwiped areas are prevented from arising by having a first cleaning area 82 and a second cleaning area 83 overlap. Additionally, the first and second cleaning areas 82 and 83 are set to be areas extending beyond the edges of the image capturing surface 20, so that the image capturing surface 20 can be wiped without leaving unwiped parts. Additionally, it is desirable that the first and second cleaning areas 82 and 83 be wiped in the same direction in order to prevent unwiped areas from remaining and push dust off of the image capturing surface 20. FIG. 8B illustrates the first cleaning area 82 wiping while moving in the travel direction 84. The second cleaning unit 5 slides more smoothly by making contact with the image capturing surface 20 while tilted in the direction opposite from the travel direction 84, relative to a plane perpendicular to the travel direction 84. Additionally, if the pixels at the edges of the image capturing surface 20 are hidden behind the shutter or the like, scanning while tilted as illustrated in FIG. 8B makes it possible for the second cleaning unit 5 to wipe even to the corners, without making contact with the shutter or the like. As such, according to the second cleaning method carried out by the second cleaning unit 5, dirt such as dust, highly-viscous oil, and the like on the image capturing surface 20 of the image sensor 22 can be removed from that surface.

In step S122, the control unit 10 controls the movable arm 6 to retract the second cleaning unit 5 from the image sensor 22 and controls the image sensor driving mechanism 27 of the camera 200 to stop keeping the image sensor 22 still. This ends the second cleaning sequence.

The overall sequence of operations carried out when cleaning according to the present embodiment will be described next with reference to FIG. 6.

Figure 6:
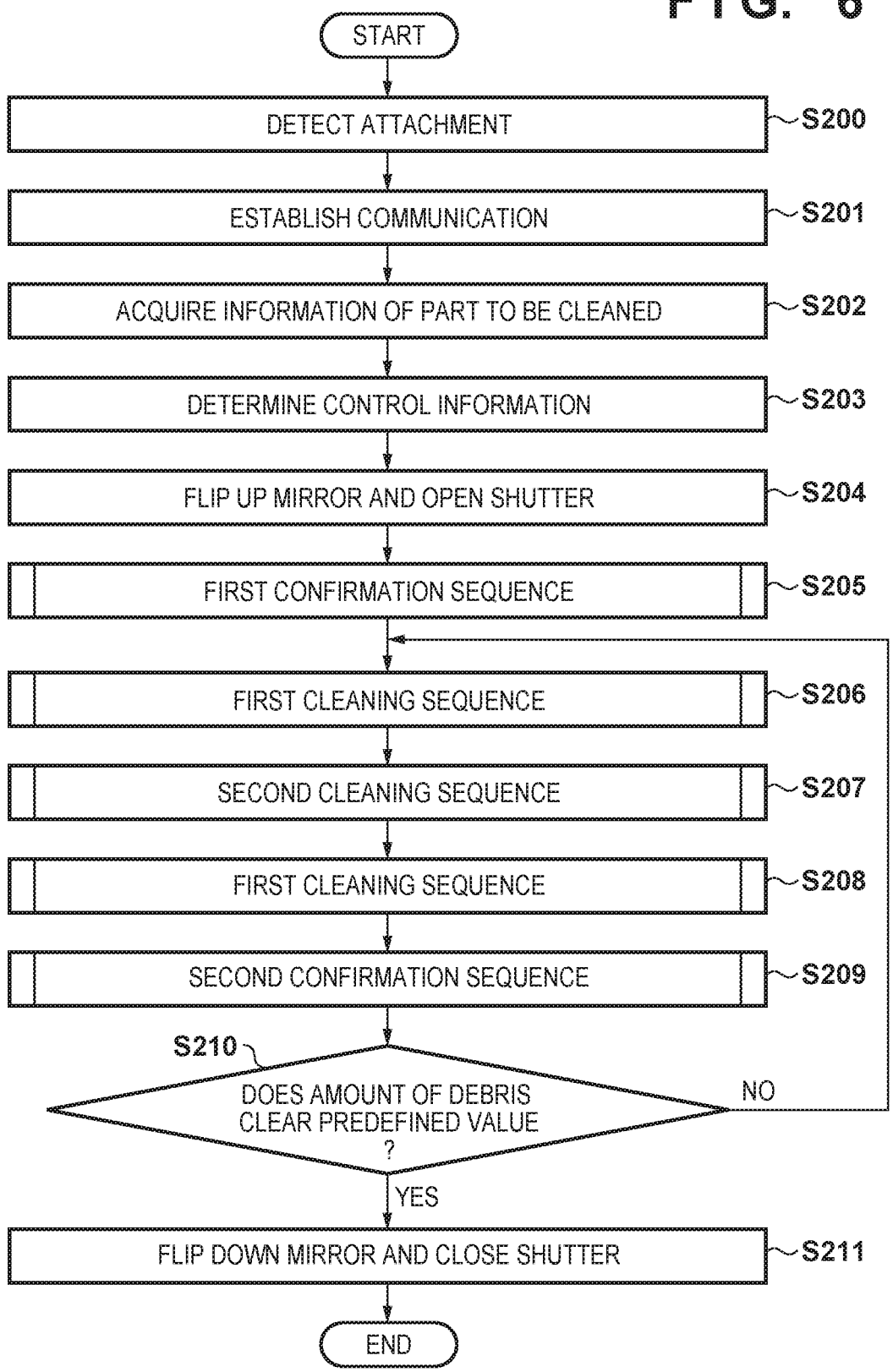
FIG. 6 is a flowchart illustrating an overall operation sequence carried out by the cleaning apparatus according to the first embodiment.

The processing illustrated in FIG. 6 is realized by the control unit 10 executing a control program stored in the memory 16, and is started in response to the power switch 15 being turned on, an instruction to start cleaning made through the input unit 8, or the like.

In step S200, the control unit 10 detects that the lens attachment 23 of the camera 200 has been attached to the camera attachment 2.

In step S201, the control unit 10 establishes communication between the cleaning apparatus 100 and the camera 200 in response to the external connection unit 17 of the cleaning apparatus 100 and the external connection unit 24 of the camera 200 being electrically connected to each other.

In step S202, the control unit 10 acquires information of the part to be cleaned. Information of the position, size, and material of the image sensor 22, the position and so on of members interfering with the cleaning of the image sensor 22, and so on can be given as examples of the information of the part to be cleaned. This information may be acquired through communication with the camera 200, or may be read out from a database, stored in the memory 16 in advance, on the basis of the camera model information, acquired from the camera 200. The information of the part to be cleaned or the model information may be acquired from a user operation made through the input unit 8. Additionally, with a configuration in which the state confirmation unit 3 is provided with a device that detects the state of the image sensor 22, the information of the part to be cleaned is acquired on the basis of information, such as an image, detected by the state confirmation unit 3.

In step S203, the control unit 10 determines control information on the basis of the information of the part to be cleaned, obtained in step S202. Specifically, driving ranges at which to move the state confirmation unit 3, the first cleaning unit 4, and the second cleaning unit 5, the position and force of ejection from the ejection port of the first cleaning unit 4, the range to be cleaned by the second cleaning unit 5, whether or not to add solvent to the wiping implement, and the like are determined on the basis of the position and size information of the image sensor 22. In the present embodiment, a plurality of cleaning courses using at least one of the first cleaning unit 4 and the second cleaning unit 5 are set. The user can then select a cleaning course, e.g., from a plurality of candidates displayed in the display unit 7, in light of the state of dirtiness, the time of the operations, and the like. Courses such as those indicated below are prepared. Although the following descriptions assume that the subsequent flow is carried out with course 1 having been selected, if another course has been selected, steps not required by the selected course may be omitted (that is, passed with no operations being carried out) as appropriate. Furthermore, the courses that can be set are of course not limited to these. Courses that can be generated by the user freely setting various sequences, including the cleaning order, number of cleanings, and so on, may be provided as well. The control unit 10 accepts settings for combined cleaning by the first cleaning unit 4 and the second cleaning unit 5, for which multiple patterns of combinations are set in advance or set manually. The control unit 10 controls the cleaning order and number of cleanings by the first cleaning unit 4 and the second cleaning unit 5, and carries out the cleaning, on the basis of the accepted settings.

Course 1: first confirmation sequence→first cleaning sequence→second cleaning sequence→first cleaning sequence→second confirmation sequence Course 2: first confirmation sequence→first cleaning sequence→second cleaning sequence→second confirmation sequence Course 3: first confirmation sequence→second cleaning sequence→first cleaning sequence→second confirmation sequence Course 4: first confirmation sequence→first cleaning sequence→second confirmation sequence Course 5: first confirmation sequence→second cleaning sequence→second confirmation sequence Course 6: first confirmation sequence In step S204, the control unit 10 sends control signals, instructing the mirror to be flipped up and the shutter to be opened, to the camera control unit 21, so that the sequence according to one of the above courses 1 to 6 can be executed. Having received the control signals instructing the mirror to be flipped up and the shutter to be opened, the camera control unit 21 moves the mirror 25 to the "up" position and opens the shutter 26. The camera control unit 21 then sends a signal, indicating that the operations are complete, to the control unit 10, and having received that signal, the control unit 10 moves to the next step. However, there are also camera models in which the cleaning is possible without carrying out this step, such as mirrorless cameras. In such a case, this step, step S211 (described later), and the like are unnecessary.

In step S205, the control unit 10 carries out the confirmation sequence illustrated in FIG. 5A as the first instance of the first confirmation sequence, carried out before the cleaning. In step S206, the control unit 10 carries out the first instance of the first cleaning sequence carried out by the first cleaning unit 4, illustrated in FIG. 5B. After the first cleaning sequence ends, in step S207, the control unit 10 carries out the second cleaning sequence using the second cleaning unit 5, as indicated in FIG. 5C. Here, the first cleaning sequence is carried out before the second cleaning sequence because removing large pieces of dust in advance through the first cleaning sequence ensures that large dust adhering to the image capturing surface 20 before the wiping by the second cleaning unit 5 will not be dragged and damage the image capturing surface.

After the second cleaning sequence ends, in step S208, the control unit 10 carries out the second instance of the first cleaning sequence by the first cleaning unit 4. The operations in this sequence may be the same as, or different from, those carried out in step S206. Here, the first cleaning sequence is carried out after the second cleaning sequence because fibers from the wiping implement may remain on the image capturing surface 20, dust pushed away from the image capturing surface 20 may remain in the periphery, and so on after the wiping by the second cleaning unit 5. If the first cleaning sequence is carried out after the second cleaning sequence, that dust can be blown away.

Once the second instance of the first cleaning sequence in step S208 ends, the post-cleaning second instance of the second confirmation sequence, indicated in FIG. 5A, is carried out in step S209. This is different from the pre-cleaning first confirmation sequence in that images, the amount of dust, and the like from before and after the cleaning can be displayed in a comparative manner in the display unit 7, as per step S104 in FIG. 5A.

In step S210, the control unit 10 determines whether or not the amount of dust clears a control value (is lower than a control value) on the basis of the post-cleaning image information acquired in step S209. If the determination indicates that the control value is not cleared, the process returns to step S206, where the cleaning is carried out again. At this time, it is preferable that the cleaning sequences be carried out again having changed the various parameters of the cleaning process, in order to remove dust that was not removed by the cleaning sequences the first time. For example, it is conceivable to increase the force of the air ejected by the first cleaning unit 4, increase the degree charging by the ionizer, lengthen the ejection time, broaden the movement range, rock the image sensor 22 more quickly, and so on. With respect to the second cleaning unit 5, it is conceivable to immerse the wiping implement in solvent (if the wiping implement was not immersed in solvent in the previous cleaning), increase the pressure of contact with the image capturing surface 20, and so on.

If the control value is cleared in step S210, the process moves to step S211, where the control unit 10 sends control signals to the camera control unit 21, instructing the mirror to be flipped down and the shutter to be closed. Having received the control signals instructing the mirror to be flipped down and the shutter to be closed, the camera control unit 21 moves the mirror 25 to the "down" position and closes the shutter 26. The camera control unit 21 then sends a signal, indicating that the operations are complete, to the control unit 10, and having received that signal, the control unit 10 ends the cleaning sequence.

In the present embodiment, the amount of dust remaining on the image sensor 22 is detected in order to confirm the state of the cleaning in step S210. However, the configuration is not limited thereto. Other analysis results may be used as a standard as long as they indicate a state of the image sensor 22 that can be analyzed from an image. Additionally, although the present embodiment describes an example in which each cleaning sequence is repeated until the amount of dust clears the control value, it is not particularly necessary to provide a repeating flow, and the result of the cleaning, e.g., the amount of dust, may simply be displayed in the display unit 7.

According to the present embodiment as described thus far, when cleaning using the first cleaning unit, which cleans the part to be cleaned using air pressure (by ejecting air), the image sensor 22 is rocked to make it easier to blow the dust off, and when cleaning using the second cleaning unit, which makes contact with and wipes the part to be cleaned, the image sensor 22 is stopped. This makes it possible to remove the dust reliably, without the image sensor 22 moving due to friction produced with the wiping implement.

Furthermore, by including a plurality of cleaning units capable of carrying out a plurality of cleaning sequences, the cleaning apparatus can handle the removal of multiple types of dust adhering to the part to be cleaned.

Variation

Another example of the cleaning method in step S121 of the second cleaning sequence will be described with reference to FIG. 9, as a variation on the present embodiment.

Figure 9:
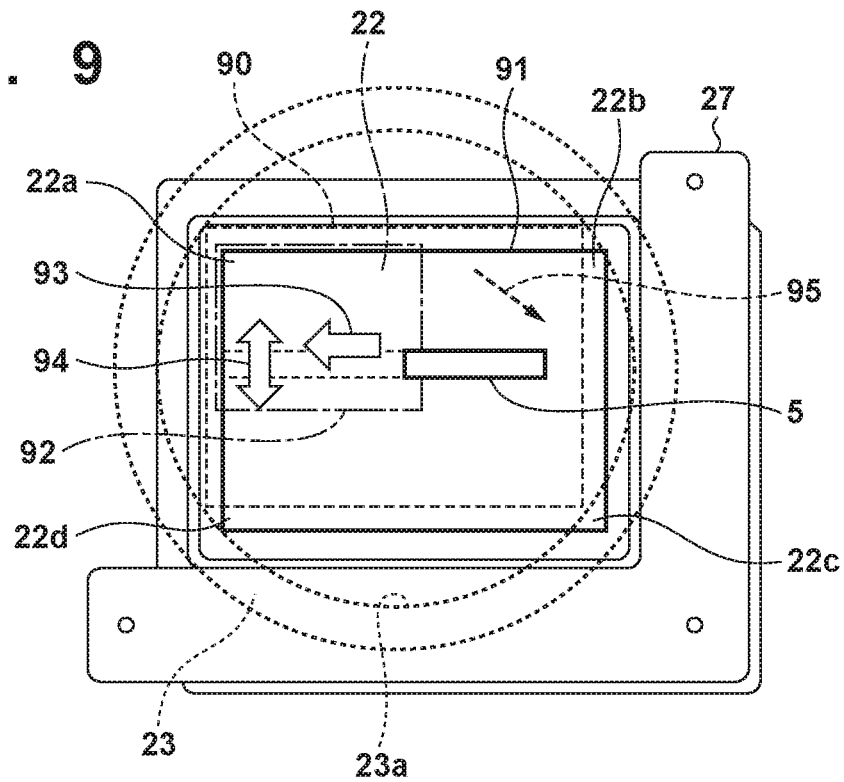
FIG. 9 is a diagram illustrating a cleaning method of the second cleaning sequence according to a variation on the first embodiment.

FIG. 9 is a diagram illustrating the image capturing surface 20 of the image sensor 22 from the front, and illustrates the positional relationship between the image sensor 22, the lens attachment 23, and the image sensor driving mechanism 27. In FIG. 9, the broken line 90 indicates the reference position of the image sensor 22. In a shooting standby state, i.e., when not executing image stabilization, cleaning, or otherwise driving the image sensor driving mechanism 27, the image sensor 22 is held still at the reference position 90, where the optical axis (optical) center of the image sensor 22 is at substantially the same position as the optical center of the lens attachment 23. A broken line 92 indicates a first cleaning area during cleaning. The first cleaning area 92 is set for the image sensor 22, and includes corners 22a to 22d of the image sensor 22. Likewise, second to fourth cleaning areas (not shown) are set so as to include the corners 22a to 22d. The first to fourth cleaning areas have parts that overlap with each other.

In the present variation, the second cleaning sequence starts with the cleaning of the first cleaning area 92. Here, the image sensor 22 is moved from the reference position 90 to a first cleaning position 91, in the direction indicated by the arrow 95 in FIG. 9, before the second cleaning unit 5 makes contact with the image sensor 22. As a result, the first cleaning area 92 moves toward the center of the opening 23a of the lens attachment 23 (the optical center of the interchangeable lens) (i.e., the optical axis center of the image sensor 22 moves away from the optical center of the lens attachment 23, which is the reference position 90). This reduces the risk of interference between the second cleaning unit 5 and surrounding components, which makes it possible to carry out the cleaning more safely. Furthermore, by moving away from the surrounding components, the freedom of the conditions of contact, such as the angle between the second cleaning unit 5 and the image sensor 22, can be increased, which makes it possible to establish an orientation more suited to cleaning.

Next, the second cleaning unit 5 makes contact with the image sensor 22, and cleans the first cleaning area 92 progressively, moving in a wiping direction 93. In this case, the image sensor driving mechanism 27 rocks the sensor slightly in a rocking direction 94. The rocking direction 94 is set to a different direction from the wiping direction 93, and thus an effect in which dust adhering in the same direction as the wiping direction 93 is easier to remove is achieved.

Once the cleaning of the first cleaning area 92 is complete, the second cleaning unit 5 temporarily retracts from the image sensor 22. Then, the image sensor 22 is moved to a second cleaning position (not shown), which corresponds to the second cleaning area. By avoiding contact with the second cleaning unit 5 when moving the image sensor 22 a long distance, such as when moving the cleaning area, negative effects of friction on the movement operations, such as scratching and unnatural streaks, can be avoided. The sequence from cleaning to moving the area is carried out in order for the first to fourth cleaning areas.

According to the variation as described above, moving the cleaning area and the image sensor driving mechanism 27 in tandem makes it possible to more safely and effectively remove dust. Although the present variation has a particular configuration in which the four corners of the part to be cleaned are exposed in the central direction, the area to be cleaned is not limited. For example, only some of the end sides may be shifted toward the center.

In the present embodiment, when the cleaning by the cleaning units, the cleaning is supported by using the image sensor driving mechanism 27 to move the image sensor 22. However, as a simpler embodiment, the image sensor driving mechanism 27 may be used to drive the image sensor 22 so as to be supported at a predetermined position when cleaning, e.g., at a position where the optical center of the lens attachment 23 and the optical axis center of the image sensor 22 substantially coincide. Additionally, if a mechanism for mechanically holding (locking) the image sensor 22 in a predetermined position, such as when the power is off, is provided, the image sensor 22 may be supported in the predetermined position using that mechanism.

Second Embodiment

Next, a second embodiment will be described with reference to FIGS. 10 to 11D.

The first embodiment described a configuration in which the image sensor 22 of the camera 200, which is the part to be cleaned, is cleaned by the cleaning apparatus 100. However, the second embodiment will describe an example in which a user (or service staff) inserts a dedicated cleaning tool from the opening 23a of the lens attachment 23 of the camera 200, and removes dust and dirt adhering to the image capturing surface 20 of the image sensor 22.

Many precision components are arranged around the image sensor 22, and users must carry out the cleaning work with great care so as to prevent damage from contact. For example, with a single-lens reflex camera, the mirror 25 is located between the lens attachment 23 and the image sensor 22. Although the mirror 25 is flipped up and retracted when cleaning, a user must take care to ensure the cleaning tool does not come into contact with the mirror 25 when cleaning around the edges of the image sensor 22. Likewise, the shutter 26 is located in front of the image sensor 22, and although the shutter 26 is opened to expose the image capturing surface of the image sensor 22 when cleaning, the shutter 26, which is a precision component, may deform if touched by the cleaning tool.

The present embodiment is configured so that the image sensor can be cleaned safely and easily, in order to solve problems such as those described above.

Next, a sequence of operations carried out by the camera 200 in a manual cleaning mode according to the present embodiment will be described with reference to FIGS. 10 to 11D.

Note that the configuration of the camera 200 is the same as described in the first embodiment with reference to FIGS. 1A to 3B. Additionally, the processing illustrated in FIG. 10 is realized by the camera control unit 21 executing a control program stored in the memory. The present embodiment assumes that at this time, the camera 200 is in the shooting standby state, and the user can view the object through the optical viewfinder 30. However, the processing illustrated in FIG. 10 can be executed even if the power is on but shooting operations are not underway, e.g., when in a playback mode, when a menu screen is being operated, and so on.

In step S300, the camera control unit 21 transitions to the manual cleaning mode in response to a user operation. It is assumed here that in step S300, the operating mode of the camera 200 is selected by the user operating a menu screen displayed in the display unit 33. However, another device may be used instead, such as a dedicated mode change switch. When transitioning to the manual cleaning mode, a message for confirming whether or not an interchangeable lens has been removed from the camera body with the user may be displayed in the screen.

The operating modes that can be selected in the camera 200 of the present embodiment include an automatic cleaning mode as well. The automatic cleaning mode shakes dust off the image capturing surface 20 of the image sensor 22 by causing the image capturing surface 20 to vibrate using the image sensor driving mechanism 27, a piezoelectric element (not shown), or the like. The manual cleaning mode according to the present embodiment is assumed to be a mode in which the user uses a special cleaning tool to manually wipe the image capturing surface 20 of the image sensor 22 clean.

After transitioning to the manual cleaning mode, in step S310, the camera control unit 21 controls the image sensor driving mechanism 27 to hold the image sensor 22 still at the reference position, where the optical axis center of the image sensor 22 is at substantially the same position as the optical center of the lens attachment 23. As a result, operations such as those carried out when the image stabilization are canceled, and the image sensor 22 is held still temporarily. Note that if a mechanism for mechanically holding (locking) the optical axis center of the image sensor 22 at the optical center of the lens attachment 23 is provided, that mechanism may be used to hold the image sensor 22 still at the reference position.

In step S320, the camera control unit 21 moves the mirror 25 to the "up" position and opens the shutter 26 to expose the image capturing surface 20 of the image sensor 22. As a result, the camera 200 enters the state illustrated in FIG. 2A, and the user can therefore access the image sensor 22 from the opening 23a of the lens attachment 23.

The process then transitions to the sequence through which the user cleans the image sensor 22 using the special cleaning tool. In step S320, the camera 200 is in a state where the user can wipe the image sensor 22 using the cleaning tool.

In step S330, the camera control unit 21 does not move to the next process until the operation button 29 is pressed. Once the operation button 29 is pressed, the process moves to step S331.

In step S331, the camera control unit 21 drives the image sensor driving mechanism 27 to bring a corner of the image sensor 22 closer to the optical center of the lens attachment 23. FIGS. 11A to 11D illustrate movement patterns A to D of the image sensor 22 relative to the lens attachment 23. The broken line circle indicates the opening 23a in the lens attachment 23. The rectangular broken line 90 indicates the reference position where the optical axis center of the image sensor 22 is at substantially the same position as the optical center of the lens attachment 23. Rectangular solid lines 91a to 91d indicate corner-shifted states in which one of the corners 22a to 22d of the image sensor 22 is positioned at one of the four corners of the movement range of the table 270 of the image sensor driving mechanism 27. The user can cycle through the movement patterns A to D by pressing the operation button 29 (YES in step S330). For example, if the corner 22a of the image sensor 22 is to be cleaned, the lens attachment 23, the mirror 25 in the "down" position, and so on are nearby when the image sensor 22 is at the reference position 90. This makes it difficult to wipe the image sensor 22 with the cleaning tool. Accordingly, pressing the operation button 29 to select the movement pattern A makes it possible to move the image sensor 22 to bring the corner 22a toward the optical center of the lens attachment 23 (i.e., so that the optical axis center of the image sensor 22 moves away from the optical center of the lens attachment 23 serving as the reference position 90), and thus a relatively broad range of the image capturing surface can be exposed from the opening 23a of the lens attachment 23. The position of the image sensor 22 can be changed for the other corners 22b to 22d in the same manner, to the positions indicated by the movement patterns B to D.

This function makes it possible for the user to move the image sensor 22 to a position where the corners 22a to 22d can be wiped more easily. The cleaning can therefore be carried out safely, with a reduced risk of contact with the surrounding components. This also increases the freedom with which the cleaning tool can be handled, the angle of contact, and so on, which makes it possible to clean with fewer unwiped areas, unevenly-cleaned parts, and so on.

Note that in step S331, if the image sensor 22 is to be cleaned using a non-contact method such as blowing air, the image sensor 22 may be rocked, whereas if the image sensor 22 is to be cleaned using a contact-based method such as wiping, the image sensor 22 may be held still. Doing so makes it easier to blow off dust by rocking the image sensor 22 when cleaning the image sensor 22 using a non-contact method, and hold the image sensor 22 when cleaning using a contact-based method such as wiping, so that the image sensor 22 does not move due to friction with the cleaning tool and the dust can be reliably removed.

Although the present embodiment describes movement patterns that make it easier to clean the corners 22a to 22d of a rectangular image sensor 22, the configuration is not limited thereto. For example, a function for shifting the edge parts of a circular or polygonal image sensor may be provided instead. Furthermore, although the present embodiment describes a function for switching the movement pattern in response to the operation button 29 being pressed, the configuration may be such that an operation member capable of specifying multiple directions, such as the multi-controller 31, is used to directly move the image sensor 22 in a desired direction.

A warning function used when the remaining battery power is low will be described next.

After the process of step S320 has been carried out, the remaining power in the battery 34 is monitored in parallel with the sequence for cleaning the image sensor 22. When the remaining power in the battery 34 drops, the camera 200 transitions to the shooting standby state and switches the power off. In the shooting standby state, the mirror 25 moves to the "down" position, the shutter 26 is open, and the image sensor 22 is shielded from light. If the camera 200 then transitions to the shooting standby state while the cleaning tool is in contact with the image sensor 22, the cleaning tool may collide with the mirror 25 or the shutter 26 and deform or damage those members. Accordingly, in step S340, the camera control unit 21 determines whether the remaining battery power is less than or equal to a predetermined threshold, and warns the user if the remaining battery power is less than or equal to the predetermined threshold (step S341). The camera 200 includes a function for displaying the remaining battery power in the display unit 33 or the like, and the user can confirm a drop in the remaining battery power by looking at the display unit 33 when in a mode aside from the cleaning mode. However, the operations for cleaning the image sensor 22 are carried out from the front surface of the camera 200, and it is therefore difficult to see the display unit 33 in the rear surface. As such, in step S341, the warning that the remaining battery power has dropped is issued using sound from the audio output unit 32 or light from the light-emitting unit 28. This function makes it possible for the user to notice a drop in the remaining battery power even when cleaning the image sensor 22, which in turn makes it possible to prevent a situation where the cleaning tool collides with the mirror 25 or the shutter 26.

Note that if the remaining battery power is greater than the predetermined threshold in step S340, the process moves to step S342. If the warning had been made in step S341, the camera control unit 21 stops the warning. If no warning had been made, the camera control unit 21 simply repeats the determination of the remaining battery power in step S340 until the cleaning mode ends.

Operations for ending the manual cleaning mode will be described next.

After the process of step S320, the user can end the manual cleaning mode.

In step S350, the camera control unit 21 does not move to the next process until an operation for ending the manual cleaning mode is made. However, once that operation is made, the process moves to step S351. Like when starting the manual cleaning mode in step S300, it is assumed here that the operating mode of the camera 200 is selected by the user operating a menu screen displayed in the display unit 33. However, another device may be used instead, such as a dedicated mode change switch.

In step S351, the camera control unit 21 moves the mirror 25 to the "down" position, closes the shutter 26, and puts the image capturing surface of the image sensor 22 in a light-shielded state. This puts the camera 200 into the shooting standby state and ends the manual cleaning mode.

According to the present embodiment, the image sensor driving mechanism 27 can move the image sensor 22 of the camera 200 into a position where the sensor can be cleaned easily, even when in the manual cleaning mode. This makes it possible to safely and more evenly clean even areas near the edges of the image sensor 22, which have thus far been difficult to clean, with fewer unwiped areas remaining.

In the present embodiment, when the cleaning by the cleaning units, the cleaning is supported by using the image sensor driving mechanism 27 to move the image sensor 22. However, as a simpler embodiment, the image sensor driving mechanism 27 may be used to drive the image sensor 22 so as to be supported at a predetermined position when cleaning, e.g., at a position where the optical center of the lens attachment 23 and the optical axis center of the image sensor 22 substantially coincide. Additionally, if a mechanism for mechanically holding (locking) the image sensor 22 in a predetermined position, such as when the power is off, is provided, the image sensor 22 may be supported in the predetermined position using that mechanism.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-175337 filed Sep. 19, 2018, 2018-175338 filed Sep. 19, 2018, and 2019-153192 filed Aug. 23, 2019, which are hereby incorporated by reference herein in their entirety.

What is claimed is:

1. A cleaning apparatus that cleans a detection surface of a detection element, the apparatus comprising:
   an attachment to which a detection apparatus including the detection element can be attached;
   a cleaning unit that performs cleaning of the detection surface of the detection element; and
   at least one processor or circuit configured to perform operations of the following units:
   a communication unit configured to communicate with the detection apparatus; and
   a control unit configured to control a driving unit of the detection element included in the detection apparatus through the communication unit,
   wherein when the cleaning by the cleaning unit, the control unit controls the position of the detection element by driving the driving unit through the communication unit,
   wherein the cleaning unit includes a first cleaning unit configured to clean the detection element without making contact with the detection element, and a second cleaning unit configured to clean the detection element by making contact with the detection element, and
   wherein the control unit changes a method for controlling the driving unit between when cleaning by the first cleaning unit and when cleaning by the second cleaning unit.

2. The cleaning apparatus according to claim 1, wherein when the cleaning by the cleaning unit, the control unit moves the position of the detection element so that the center of the detection element shifts in a direction away from the center of the attachment.

3. The cleaning apparatus according to claim 1, wherein when the cleaning by the first cleaning unit, the control unit controls the driving unit to rock the detection element.

4. The cleaning apparatus according to claim 1, wherein when the cleaning by the second cleaning unit, the control unit controls the driving unit to hold the detection element still.

5. The cleaning apparatus according to claim 1, wherein when the cleaning by the second cleaning unit, the control unit moves the position of the detection element so that the center of the detection element shifts from the same position as the center of the attachment, in a direction away from the center of the attachment.

6. The cleaning apparatus according to claim 1, wherein the detection apparatus is an image capture apparatus, and the detection element is an image sensor; and
   the cleaning apparatus cleans an image capturing surface of the image sensor.

7. A system comprising a cleaning apparatus that cleans a detection surface of a detection element and a detection apparatus including the detection element, wherein the cleaning apparatus includes:
an attachment to which the detection apparatus including the detection element can be attached;
a cleaning unit that performs cleaning of the detection surface of the detection element and
at least one processor or circuit configured to perform operations of the following units:
a communication unit configured to communicate with the detection apparatus; and
a control unit configured to control a driving unit of the detection element included in the detection apparatus through the communication unit,
wherein when the cleaning by the cleaning unit, the control unit controls the position of the detection element by driving the driving unit through the communication unit,
wherein the cleaning unit includes a first cleaning unit configured to clean the detection element without making contact with the detection element, and a second cleaning unit configured to clean the detection element by making contact with the detection element,
wherein the control unit changes a method for controlling the driving unit between when cleaning by the first cleaning unit and when cleaning by the second cleaning unit, and
wherein the detection apparatus includes
the driving unit capable of moving the position of the detection element;
an attachment that can be attached to the cleaning apparatus; and
at least one processor or circuit configured to perform operations of the following units:
a communication unit configured to communicate with the cleaning apparatus; and
a control unit configured to control the driving unit,
wherein the control unit controls the driving unit by communicating with the cleaning apparatus through the communication unit in a state where the detection apparatus is attached to the cleaning apparatus by the attachment.

* * * * *